United States Patent

Hashimura et al.

(10) Patent No.: US 8,845,825 B2
(45) Date of Patent: Sep. 30, 2014

(54) HIGH STRENGTH SPRING-USE HEAT TREATED STEEL

(75) Inventors: Masayuki Hashimura, Muroran (JP); Tatsuro Ochi, Muroran (JP); Takayuki Kisu, Muroran (JP); Hiroshi Hagiwara, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 228 days.

(21) Appl. No.: 11/919,735

(22) PCT Filed: Mar. 29, 2007

(86) PCT No.: PCT/JP2007/057624
§ 371 (c)(1),
(2), (4) Date: Oct. 30, 2007

(87) PCT Pub. No.: WO2007/114490
PCT Pub. Date: Oct. 11, 2007

(65) Prior Publication Data
US 2009/0092516 A1    Apr. 9, 2009

(30) Foreign Application Priority Data
Mar. 31, 2006   (JP) .................. 2006-099199

(51) Int. Cl.
| | |
|---|---|
| C22C 38/08 | (2006.01) |
| C23C 8/20 | (2006.01) |
| C23C 8/24 | (2006.01) |
| C23C 8/00 | (2006.01) |
| C23C 8/26 | (2006.01) |
| C23C 8/50 | (2006.01) |
| C23C 22/00 | (2006.01) |
| C22C 38/16 | (2006.01) |
| C22C 33/00 | (2006.01) |
| C22C 38/60 | (2006.01) |
| C22C 38/02 | (2006.01) |
| C22C 38/18 | (2006.01) |
| C21D 9/52 | (2006.01) |
| C22C 38/34 | (2006.01) |
| C22C 38/04 | (2006.01) |
| C22C 38/00 | (2006.01) |

(52) U.S. Cl.
CPC . C21D 9/52 (2013.01); C22C 38/02 (2013.01); C22C 38/18 (2013.01); C22C 38/34 (2013.01); C22C 38/04 (2013.01); C22C 38/001 (2013.01); C22C 38/60 (2013.01)
USPC .......... 148/336; 148/332; 148/320; 148/319; 148/318; 148/317; 148/316; 148/238; 148/232; 148/231; 148/230; 148/226; 148/225; 148/218; 148/212; 148/206; 420/89; 420/88; 420/87; 420/84

(58) Field of Classification Search
None
See application file for complete search history.

(56) References Cited

U.S. PATENT DOCUMENTS

| | | | |
|---|---|---|---|
| 4,574,016 A * | 3/1986 | Yamamoto et al. | ........... 148/547 |
| 5,904,787 A | 5/1999 | Matsumoto et al. | |

(Continued)

FOREIGN PATENT DOCUMENTS

| | | |
|---|---|---|
| CN | 1152625 | 6/1997 |
| JP | 57-032353 | 2/1982 |

(Continued)

OTHER PUBLICATIONS

Rahman et al, Low Temperature Plasma Nitriding Of 316 Stainless Steel, 200 Surface and Coatings Technology 1645-51 (Nov. 2005).*

(Continued)

*Primary Examiner* — Yoshitoshi Takeuchi
(74) *Attorney, Agent, or Firm* — Kenyon & Kenyon LLP

(57) ABSTRACT

The present invention provides spring use heat treated steel which is cold coiled, can achieve both sufficient atmospheric strength and coilability, has a tensile strength of 2000 MPa or more, and can improve the performance as a spring by heat treatment after spring fabrication, that is, high strength spring-use heat treated steel characterized by containing, by mass %, C: 0.45 to 0.9%, Si: 1.7 to 3.0%, and Mn: 0.1 to 2.0%, restricting N: to 0.007% or less, having a balance of Fe and unavoidable impurities, and satisfying, in terms of the analyzed value of the extracted residue after heat treatment, [amount of Fe in residue on 0.2 μm filter/[steel electrolysis amount]×100≤1.1.

7 Claims, 1 Drawing Sheet

(56) References Cited

U.S. PATENT DOCUMENTS

| | | | |
|---|---|---|---|
| 6,277,220 B1* | 8/2001 | Hamada et al. | 148/595 |
| 6,338,763 B1 | 1/2002 | Hashimura et al. | |
| 2004/0112473 A1* | 6/2004 | Hashimura et al. | 148/333 |

FOREIGN PATENT DOCUMENTS

| | | | | |
|---|---|---|---|---|
| JP | 5-331597 | A | 12/1993 | |
| JP | 7-157846 | A | 6/1995 | |
| JP | 2001-181794 | * | 7/2001 | C22C 38/00 |
| JP | 2001-181794 | A | 7/2001 | |
| JP | 2002-47539 | A | 2/2002 | |
| JP | 2002-180198 | | 6/2002 | |
| JP | 2004-143482 | A | 5/2004 | |
| KR | 2003-81425 | | 10/2003 | |
| WO | WO 02/63055 | A1 | 5/2002 | |

OTHER PUBLICATIONS

English translation of JP 2001-181794 (2001).*

Korean Office Action dated Aug. 6, 2009 issued in corresponding Korean Application No. 2007-7026307.

Chinese Office Action dated Dec. 25, 2009 issued in corresponding Chinese Application No. 2007800004797.

Berntsson et al., "Alternative to Lead Bath for Patenting of High Carbon Steel Wire" 2004, Wire J. Int. JST 37(5):82-86 (w/ English translation).

Lundberg et al.,"Low Temperature Rolling Save Energy in the Rolling of Wire and Bar," Int. Walzw. 1984(2):486-500 (w/ English translation).

* cited by examiner

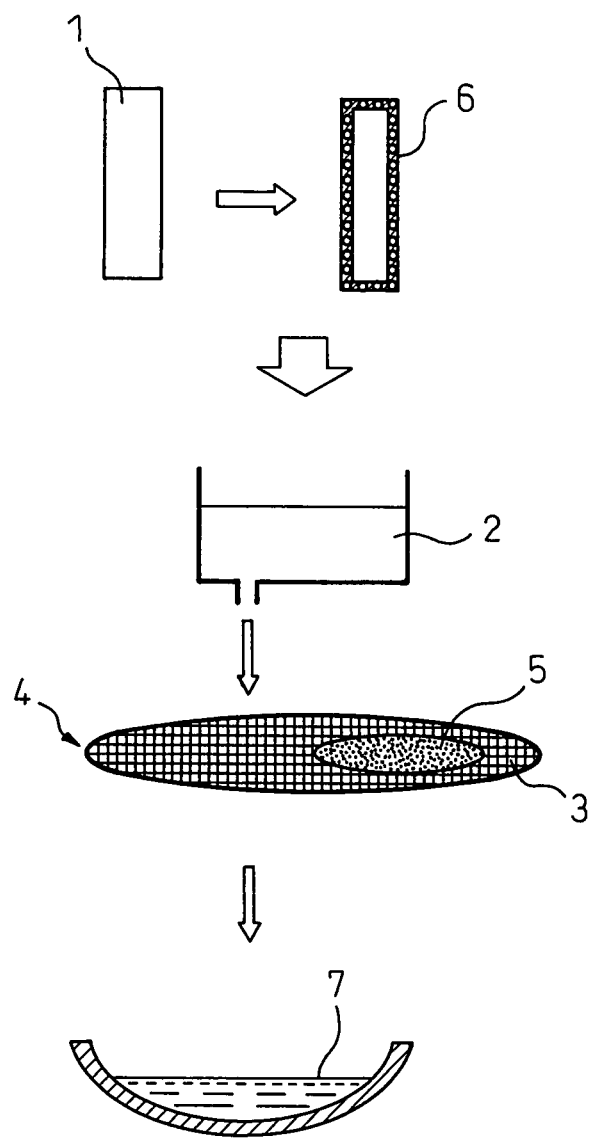

HIGH STRENGTH SPRING-USE HEAT TREATED STEEL

TECHNICAL FIELD

The present invention relates to high strength heat treated spring steel having high strength and high toughness suitable for being hot or cold coiled, in particular cold coiled and nitrided.

BACKGROUND ART

Along with the reduction in weight and improvement in performance of automobiles, springs are being made higher in strength. High strength steel having a tensile strength exceeding 1500 MPa after heat treatment is being used for springs. In recent years, steel wire having a tensile strength exceeding 2100 MPa is also being sought. This is so as to secure a hardness of material where even with some softening due to stress-relief annealing, nitridation, and other heating at the time of spring production, there is no problem for the spring.

Further, it is known that with nitridation or shot peening, the surface hardness rises and the durability during spring fatigue is remarkably improved, but the spring setting characteristic is not determined by the surface hardness. The internal strength or hardness of the spring material also has a great effect. Therefore, it is important to design compositions able to maintain the internal hardness extremely high.

As a technique for this, there is an invention adding V, Nb, Mo, or another element to form fine carbides dissolving by quenching and precipitating by tempering and thereby limiting the movement of dislocations and improving the anti-setting property (for example, see Japanese Patent Publication (A) No. 57-32353).

On the other hand, among the methods for production of steel coil springs, there are "hot coiling" comprising heating the steel to the austenite region for coiling, then quenching and tempering it and "cold coiling" comprising quenching and tempering the steel in advance and cold coiling the resultant high strength steel wire. With cold coiling, it is possible to use oil tempering, high frequency treatment, etc. enabling rapid heating and rapid cooling at the time of production of the steel wire, so it is possible to reduce the grain size of the prior austenite of the spring material. As a result, it is possible to produce a spring superior in fracture characteristics. Further, it is possible to simplify the heating furnace and other facilities on the spring production line, so there is the advantage to the spring manufacturers as well that this leads to a reduction in the capital costs. Recently, springs are being cold worked. In suspension springs, compared with valve springs, thicker steel wires are used, but cold coiling is introduced due to its advantages.

However, if the spring-use steel wire for cold coiling increases in strength, it will break at the time of cold coiling and will be unable to be formed into a spring shape in many cases. Up to now, both strength and workability could not be achieved, so the wire had to be coiled by industrially disadvantageous methods of hot coiling or coiling, then quenching and tempering to obtain both strength and workability.

Further, when cold coiling and nitriding high strength heat treated steel wire to secure its strength, it has been believed effective to add large amounts of V, Nb, and other so-called alloy elements causing precipitation of fine carbides in the steel. However, if actually adding large amounts, they will not dissolve by the heating at the time of quenching, but will grow coarser and form so-called undissolved carbides which will become factors behind fracture at the time of cold coiling. Therefore, technology focusing on the undissolved carbides has also been seen.

There is an invention aiming at improvement of performance by controlling not only the alloy elements, but also the carbides such as the cementite present in large amounts in the steel (for example, see Japanese Patent Publication (A) No. 2002-180198).

These patents prescribe the spherical carbides in detail and try to achieve both workability and higher spring strength, but even if suppressing the carbides of such relatively clear spherical carbides (alloy-based and cementite-based), there are limits to further increase of the strength and improvement of the spring performance. That is, these provisions by nature strongly suppress "defects" and suppress deterioration of the workability. There were also limits to the direct strengthening of the spring performance.

DISCLOSURE OF THE INVENTION

The present invention has as its object the provision of spring use heat treated steel which is cold coiled, can achieve both sufficient ordinary temperature strength and coilability, has a tensile strength of 2000 MPa or more, and can improve the performance as a spring by heat treatment after spring fabrication.

The inventors controlled the behavior of the Fe carbides in the steel, which had never been taken note of up to now, so as to develop heat treated steel superior in toughness and workability regardless of the high strength. Further, the present invention is effective for control of the material quality inside the spring after shaping. The present invention has as its gist the following:

(1) High strength spring-use heat treated steel characterized by
containing, by mass %,
C: 0.45 to 0.9%,
Si: 1.7 to 3.0%, and
Mn: 0.1 to 2.0%,
restricting N: to 0.007% or less,
having a balance of Fe and unavoidable impurities, and
satisfying, in terms of the analyzed value of the extracted residue after heat treatment,
[amount of Fe in residue on 0.2 μm filter/[steel electrolysis amount]×100≤1.1.

(2) High strength spring-use heat treated steel as set forth in (1) characterized by further containing, by mass %, one or more of
Cr: 0.5 to 2.5%,
V: 0.02 to 0.1%,
Nb: 0.001 to less than 0.05%,
Ti: 0.001 to less than 0.05%,
W: 0.05 to 0.5%,
Mo: 0.05 to 0.5%,
Ta: 0.001 to 0.5%,
Ni: 0.05 to 3.0%,
Cu: 0.05 to 0.5%,
Co: 0.05 to 3.0%,
B: 0.0005 to 0.006%,
Te: 0.0002 to 0.01%,
Sb: 0.0002 to 0.01%,
Mg: 0.0001 to 0.0005%,
Zr: 0.0001 to 0.0005%,
Ca: 0.0002 to 0.01%, and
Hf: 0.0002 to 0.01%.

(3) High strength spring-use heat treated steel as set forth in (1) or (2) characterized further by restricting, by mass %, Al to 0.005% or less.

(4) High strength spring-use heat treated steel characterized by having the steel compositions as set forth in any of (1) to (3), having a prior austenite grain size number after quenching and tempering of #10 or more, and having residual austenite in an amount of 15 mass % or less.

BRIEF DESCRIPTION OF THE DRAWINGS

FIG. 1 is a schematic view for explaining a method of analysis of an amount of Fe on a 0.2 μm filter in analysis of Fe by electrolysis (speed method).

BEST MODE FOR CARRYING OUT THE INVENTION

The inventors prescribed the chemical compositions for obtaining high strength and further heat treated the steel to control the shapes of the carbides in the steel and secure sufficient coilability for production of springs and thereby invented a spring-use heat treated steel enabling improvement of the spring performance by annealing or other heat treatment after being spring fabrication. The details are shown below.

First, the chemical compositions of the steel will be explained.

C: 0.4 to 0.9%

C is an element having a large effect on the basic strength of the steel material. To obtain a strength more sufficient than the past, the amount was made 0.4 to 0.9%. If less than 0.4%, a sufficient strength cannot be obtained. In particular even in the case of eliminating the nitridation for improving the spring performance, to secure a sufficient spring strength, 0.4% or more of C is preferable. If over 0.9%, de facto over coprecipitation results and a large amount of coarse cementite precipitates, so the toughness is remarkably reduced. This simultaneously reduces the coiling characteristics. Therefore, the upper limit of the amount of C was made 0.9%.

Further, the relationship with the microstructure is also close. If less than 0.4%, the number of carbides is small, so the area ratio of regions where the carbide distribution is locally smaller than other parts (hereinafter referred to as "carbide-poor regions") easily increases and a sufficient strength and toughness or coilability (ductility) are difficult to obtain. Therefore, the amount is preferably made 0.55% or more, from the viewpoint of the balance of strength and coiling, is more preferably made 0.6% or more.

Furthermore, if considering the behavior of C in the steel, C bonds with the Fe and the other alloy elements in the steel to form carbides by quenching and tempering and other heat treatment up to the fabrication of the spring. As carbides to which Fe is bonded, there are ε carbides ($Fe_nC:n<3$) and θ carbides (so-called "cementite") and the like. ε carbides are formed by a relatively low temperature of tempering temperature. Then, if the temperature becomes high, C begins to form cementite. In the process of the temperature gradually being raised and the ε carbides disappearing and cementite being formed, it is thought that the steel becomes brittle. Therefore, Si was added in a large amount etc. to inhibit the formation of cementite and suitable heat treatment was performed to achieve both high strength and high toughness.

On the other hand, when the amount of C is large, dissolution of alloy-based or cementite-based carbides by the heating at the time of quenching tends to become difficult. When the heating temperature at the time of heat treatment is high and when the heating time is short, the strength and the coilability are often insufficient.

Further, in industrial production lines where steel is heat treated by heat at a high speed and short time, undissolved carbides easily remain due to insufficient heating. These undissolved carbides are observed in both Fe-based and V or other alloy-based steels. They themselves not only become stress concentration points, but also have an effect on the C concentration in the surroundings. Due to the drop in the actual C in the matrix, they form carbide-poor regions where the distribution of carbides becomes smaller than other locations and cause a drop in the mechanical properties. That is, if C forms undissolved carbides in the steel, the amount of substantive C in the matrix falls and the area ratio of so-called carbide-poor regions where the distribution of carbides becomes smaller than other locations sometimes increases. These carbide-poor regions reduce the mechanical properties, so must be avoided at all costs. For this reason as well, undissolved carbides and other uneven distribution of C in the steel are preferably avoided.

Further, if the amount of C is increased as with spring steel, in the case of medium carbon steel, the form of the martensite at the time of tempering becomes general lath martensite, while if the amount of C is large, it is known that the form changes to lenticular martensite. As a result of research and development, the inventors discovered that the carbide distribution of a tempered martensite structure formed by tempering lenticular martensite is lower in carbide density compared with one obtained by tempering lath martensite. Therefore, by increasing the amount of C, the increase in the lenticular martensite or undissolved carbides causes the carbide-poor regions to increase in some cases. For this reason, the content is preferably made 0.7% or less, more preferably 0.65% or less, whereby the formation of cementite is suppressed relatively easily, the undissolved carbides or carbide-poor regions are reduced, and strength, toughness, and workability can be obtained.

Si: 1.7 to 3.0%

Si is an element necessary for securing the spring strength and the hardness and anti-setting characteristic. If less than 1.7%, the necessary strength and anti-setting characteristic are insufficient, so 1.7% was made the lower limit. In particular, in the present invention, in order to achieve both high strength and workability using ε carbides, the Si content which exerts an influence on the behavior is important. That is, if adding Si in a large amount, the formation temperature of the cementite rises, so cementite will not easily form even in the relatively high temperature of the tempering temperature or annealing temperature at the quenching and tempering for obtaining general spring material strength. Because of this, it is possible to prevent embrittlement of the steel and achieve both high strength and good workability.

Further, Si has the effect of making the Fe carbide-based precipitates at the grain boundaries spherical and finer. There is an effect of making the Fe carbides finer and reducing the occupied area ratio of the grain boundary precipitates at the grain boundaries. However, if added in too large an amount, not only is the material made to harden, but also it is made brittle. Therefore, to prevent embrittlement after quenching and tempering, 3.0% was made the upper limit. Here, "iron-based carbides" include, in addition to the so-called cementite, the $Fe_{2-3}C$ known as ε-carbide etc.

Si is also an element contributing to tempering softening resistance, so to produce a high strength wire material, a large amount is preferably added to a certain extent. Specifically, 2% or more is preferably added. On the other hand, to obtain a stable coilability, preferably 2.6% or less is added.

Mn: 0.1 to 2.0%

Mn is frequently used for deoxidation or immobilization of the S in the steel as MnS and improves the quenching ability to obtain sufficient hardness after heat treatment. To secure this stability, 0.1% is made the lower limit. Further, to prevent embrittlement by Mn, the upper limit was made 2.0%. Further, to achieve both strength and coilability, 0.3 to 1% is preferable. When giving priority to the coiling, making the amount 1.0% or less is effective, but still less is effective.

N: Restricted to 0.007% or Less

In the present invention, a strict limit value of N≤0.007% is prescribed. The effects of N in steel are as follows: (1) It is present as dissolved N in ferrite and suppresses movement of dislocations in the ferrite to thereby make the ferrite harden, (2) it forms nitrides with Ti, Nb, V, Al, B, and other alloy elements to affect the performance of the steel material. The mechanism etc. will be explained later. (3) It affects the precipitation behavior of cementite and other iron-based carbides and affects the performance of the steel material.

In spring steel, the strength is secured by alloy elements such as C, Si, and V, so the effect of hardening by the dissolved N is not large. On the other hand, when considering the cold working (coiling) of the spring, it suppresses movement of dislocations and thereby suppresses deformation of the worked parts and causes embrittlement of the worked parts, so lowers the coiling characteristic.

Further, among the elements defined in claim 2, V, Nb, Ti, and Ta form precipitates in the steel at a high temperature. The chemical compositions are mainly nitrides at a high temperature. Along with cooling, they are changed in form to carbonitrides and carbides. Therefore, the nitrides formed at a high temperature easily become nuclei for the precipitation of V carbides. This means that undissolved carbides are easily formed at the time of heating in the patenting or quenching process. These form nuclei, so easily grow in size.

Further, if viewed from the viewpoint of cementite, in the high strength spring such as the present invention, from the required strength, the tempering is performed at a tempering temperature of 300 to 500° C. In spring steel, from the characteristic compositions, the iron-based carbides formed at the time of tempering are made to change complicatedly in form to ε-carbide or θ-carbide (so-called cementite $Fe_3C$). Therefore, this has an effect on the ductility and other mechanical properties of the steel. N also has an effect on the formation of its carbides. If the amount of N is small, the ductility and toughness at 350 to 500° C. are improved. Further, if N exceeds 0.007%, V-based nitrides are easily formed, a large amount of undissolved carbides are formed, and, depending on the form of the ferrite or carbides, the steel is embrittled. In the present invention, to reduce the damage by such N, the amount of N is limited to N≤0.007%. Further, the amount of N is preferably kept down to 0.004% or less. Further, as explained later, it is also effective to add slight amounts of one or more of Ti, Ta, and Nb. For this reason, the upper limit of the amount of N is preferably 0.005%, more preferably 0.004%. This precision control of the N suppresses ferrite embrittlement and suppresses formation of V-based nitrides and thereby suppresses the formation and growth of undissolved carbides. Further, controlling the form of the iron-based carbides enables improvement of the toughness.

In this way, even when adding Ti, Ta, or Nb, if considering the ease of heat treatment etc., the amount of N is preferably made 0.005% or less. The smaller the amount of N the better. While substantially 0% is also all right, N easily is mixed in from the atmosphere in the steelmaking process etc., so considering the production costs and the ease in the denitridation process, the amount is preferably 0.0015% or more.

The provision that, in terms of the analyzed value of the extracted residue after heat treatment, [amount of Fe in residue on 0.2 μm filter]/[Steel electrolysis amount]×100≤1.1 will be explained next.

This provision is a key point of the present invention. Up until now, it was well known that the amount of C and heat treatment exert a very large influence on the strength and toughness of the steel. However, while the general understanding that the harder, the poorer the toughness can be applied to spring steel to a certain extent, when steel is used adjusted to so-called tempered martensite obtained by quenching and tempering, even if the tempering temperature of low temperature brittleness, high temperature brittleness, etc. is high, in a specific temperature range, the steel will sometimes be inferior in toughness to low temperature tempered materials.

However, the relationship between the detailed form and mechanical properties is surprisingly not known in many respects. The present invention utilizes a phenomenon which was never believed in the past, that is, that even if the hardness (tensile strength) is high, the toughness is high, and which runs counter to the common understanding. That is, up until now, when a high level was demanded from steel in terms of both strength and toughness, one had to be sacrificed. Believing that a change in the form of the iron-based carbides would promote embrittlement, technology was established in the present invention for controlling this and utilizing it in spring steel so as to achieve both higher strength and higher toughness of the spring steel. In the present invention, the Fe-based carbides formed in the tempering process are adjusted to so-called ε carbides ($Fe_nC$), n<3) and the Fe-based carbides are made to finely disperse in the steel so as to improve both the strength and toughness.

In the present invention, the inventors studied the mechanism of this and invented technology giving a sufficient toughness even with low temperature tempering, specifically, even with a high hardness.

In the relationship of the Fe-based carbides and toughness, with quenching and tempering, supersaturated C in the quenched steel precipitates as carbides of Fe at the lattice defects and grain boundaries in the process of tempering, but the precipitates change along with the temperature and time. Their complicated behavior influences the toughness as well. That is, it is believed that ε carbides change to θ carbides (cementite: Fe carbides mainly comprised of $Fe_3C$) resulting in embrittlement and making sufficient ductility impossible to obtain.

In Fe-based carbides which precipitate at a tempering temperature of a relatively low temperature of less than 450° C., the atomic ratio of Fe and C is close to 1:1. So-called ε carbides precipitate. When the tempering temperature is high, θ carbides start to precipitate at locations different from the ε carbides. The temperature can be considered to be, in the case of spring steel, 450° C. or more because Si is excessively added. Furthermore, at a tempering temperature over 500° C., a large part of the supersaturated C precipitates as θ carbides in large amounts. On top of this, the grains become coarser. Therefore, even if adding large amounts of V, Cr, and other so-called alloy elements, it becomes difficult to secure strength.

Consequently, by suppressing the heating temperature to less than 450° C. after quenching, in the tempering process, and in the stress relief process and nitridation after spring fabrication, a material having high toughness while maintaining its strength can be maintained.

Therefore, in the present invention, the behavior of the Fe-based carbides is taken note of and technology for achieving both strength and toughness is established by inhibiting the shift to θ carbides as much as possible. That is, the ratio of the numbers of atoms of Fe and C of the ε carbides is 3 or less and the θ carbides are considered to be $Fe_3C$, so the amount of Fe in the ε carbides is smaller than in the θ carbides. Therefore, in the present invention, the precipitates formed in the tempering process are sampled by electrolytic extraction and the amount of Fe detected by this is restricted to be small so as to achieve both strength and toughness of the steel. Therefore, it is important that the analysis value of the extracted residue after heat treatment satisfy [amount of Fe in residue on 0.2 μm filter]/[steel electrolysis amount]×100≤1.1. If the analysis value of the extracted residue after heat treatment is over 1.1, it is difficult to achieve both strength and toughness of the steel and, furthermore, there are even times where both strength and toughness deteriorate.

Specifically, the solution obtained by dissolving the ferrite composition by electrolytic extraction can be filtered by a 0.1 μm mesh filter so as to obtain the precipitates in the steel as residue and the amount of Fe in the residue can be measured to obtain a grasp of the amount of formation of cementite (θ carbides).

Here, the method of measuring the amount of Fe on the 0.2 μm filter will be explained. FIG. 1 is a schematic view for explaining the method of analysis of the amount of Fe in residue on a 0.2 μm filter in analysis of Fe by electrolysis (speed method). In the present invention, quenched and tempered heat treated steel wire is electrolyzed to dissolve the ferrite component and obtain an electrolytic solution by the speed method. This solution is filtered by a 0.2 μm filter to obtain an extract residue on the filter as shown in the schematic view of FIG. 1.

That is, for the electrolysis in the Fe analysis, the so-called speed method is used. This method is also used for preparation of replica samples for transmission type electron microscopes for observing ferrous materials. The potential and solution are strictly controlled during the electrolysis so as to enable the ferrite component to be preferentially electrolyzed. Specifically, a constant potential electrolysis system using a Model FV-138 electrolysis apparatus made by Fujiwara Seisakusho is used. As shown in FIG. 1, the solution is a commercially available speed method electrolytic solution (product name Electrolyte A). After finishing electrolysis of the test piece (heat treated steel wire after quenching and tempering) by 2000 coulomb in the electrolytic solution 2 by the speed method, the solution is suction filtered by a 0.2 μm mesh filter 3 to obtain the residue 5. Further, it is possible to precisely measure 6 the weight of the steel wire before and after electrolysis to measure the amount of electrolysis of the sample. Further, by measuring the amount of Fe in the residue, it is possible to obtain a grasp of the amount of relatively coarse Fe-based carbides (mass %) remaining on the filter.

The amount of Fe in the residue on the filter can be measured by spectrometry (ICP) based on Attachment 1 of JIS G 1258-1999. By dividing this by the amount of electrolysis and multiplying it by 100, it is possible to obtain the amount of Fe included in the residue (mass %).

In general, the smaller the mesh, the more coarse precipitates remain on the filter as residue 5, but in practice, even with a filter of 0.2 μm mesh, precipitates of 0.2 μm or less remain and are obtained. Due to this, in the present invention, even 0.2 μm or less precipitates are taken note of for finer carbide control. Therefore, in analysis of the solution 7 passing through a 0.2 μm filter, the amount of Fe in the dissolved state or contained in extremely fine precipitates smaller than the filter mesh size is measured.

The Fe-based carbides formed after quenching and tempering also remain after spring fabrication. At this time, while changing due to stress relief annealing and nitridation, the ε carbides for achieving both hardness and toughness are small, so when large in number, the amount of Fe in the residue on the filter should be small. Consequently, utilizing ε carbides in order to achieve both high hardness and high toughness as in the present invention is technology valid even after spring fabrication. The present invention is technology which can be applied even to springs after spring fabrication.

Cr: 0.5 to 2.5%

Cr is an effective element for improving the quenching ability and the tempering softening resistance. Further, in the nitridation such as seen in recent high strength valve springs, it is an element effective not only for securing tempering hardness, but also increasing the surface layer hardness after nitridation and the depth of the hardened layer. However, if the amount of addition is large, not only is an increase in cost incurred, but also the cementite seen after the quenching and tempering is made coarser. Further, the alloy-based carbides are stabilized and made coarser as an effect. As a result, the wire material becomes brittle, so easily breaks at the time of coiling. Therefore, when adding Cr, if not 0.5% or more, the effect is not clear. Further, 2.5%, where the embrittlement becomes remarkable, was made the upper limit. However, in the present invention, by prescribing the N, the carbides are controlled to become fine, so a large amount of Cr can be added. The amount of addition easily giving a high strength was therefore used.

Further, when performing nitridation, addition of Cr enables the nitridation hardened layer to be made deeper. Therefore, addition of 1.1% or more is preferable. Further, addition of 1.2% or more is preferable for nitridation for high strength springs never before seen.

Cr obstructs the melting of the cementite by heating, so if the amount of C becomes a large more than 0.55%, suppressing the amount of Cr enables the formation of coarse carbides to be suppressed and both strength and coilability to be easily achieved. Therefore, preferably the amount of addition is made 1.7% or less.

V: 0.02 to 0.1%

V causes precipitation of carbides and hardening at the time of tempering for secondary precipitation hardening etc., so can be utilized for hardening the steel wire at the tempering temperature or for hardening the surface layer at the time of nitridation. Further, it is effective for suppression of coarsening of the grain size of the austenite due to the formation of nitrides, carbides, and carbonitrides, so addition is preferable. However, nitrides, carbides, and carbonitrides of V are also formed at the austenite transformation temperature $A_3$ point of steel or more, so when insufficiently dissolved, easily remain as undissolved carbides (nitrides). The undissolved carbides not only become a cause of fracture at the time of spring coiling, but also "wastefully consume V". They reduce the effect of improvement of the tempering softening resistance and secondary precipitation hardening due to the added V and end up reducing the spring performance. Therefore, up until now, it was considered preferable to make the amount 0.1% or less for industrial heat treatment using high speed, short time heating such as for OT wire.

However, in the present invention, the amount of N is controlled to suppress the formation of V-based nitrides, carbides, and carbonitrides at the austenite transformation temperature $A_3$ point or more, so that much more V can be added.

The amount of V added was therefore made 0.02% to 0.1%. If the amount of addition is less than 0.02%, there is little effect of improvement of the hardness of the nitride layer, increase of the depth of the nitride layer, or other effects of addition of V, so 0.02%, more preferably 0.05% is preferably added. Further, if the amount of addition is over 0.1%, coarse undissolved inclusions are formed, the toughness is reduced, and, in the same way as Mo, a supercooled structure easily results which easily causes cracking or fracture at the time of drawing. Therefore, 0.1%, where industrially stable handling becomes easy, was made the upper limit.

Nitrides, carbides, and carbonitrides of V are also formed at the austenite transformation temperature $A_3$ point or more of steel, so when these are insufficiently dissolved, they easily remain as undissolved carbides (nitrides). Therefore, if considering the current industrial ability to control the nitrogen content, industrially the content is preferably made 0.1% or less, more preferably 0.07% or less. On the other hand, in surface hardening by nitridation, the material is reheated to a temperature of 300° C. or more, so to suppress the hardening of the surfacemost layer or softening of the internal hardness due to nitridation, addition of over 0.05% is preferable.

Nb: 0.001 to less than 0.05%

Nb forms nitrides, carbides, and carbonitrides. The nitrides are formed at a higher temperature than V. For this reason, by forming Nb nitrides at the time of cooling to bond with the N in the steel, the V-based nitride formation temperature is lowered. Therefore, in the numerous heat treatment processes applied to a material up to the spring fabrication, it is possible to suppress coarsening of the V-based carbonitrides and promote dissolution in the heating process of the transformation point or higher. As a result, the formation of V-based undissolved carbides can be suppressed, so the spring workability of the high strength steel wire and the tempering softening resistance by the V-based precipitates after spring fabrication can be effectively secured.

Further, in addition to the suppression of coarsening of the grain size of austenite by Nb-based carbonitrides, these may be used for hardening the steel wire in the tempering temperature and for hardening the surface layer at the time of nitridation. However, if the amount of addition is too great, undissolved carbides having Nb-based nitrides as nuclei will easily remain, so addition of a large amount should be avoided. Specifically, if the amount of addition of Nb is less than 0.001%, almost no effect of addition can be observed. Further, if 0.05% or more, addition of a large amount would form coarse undissolved inclusions and lower the toughness and, like with Mo, would easily cause the formation of a supercooled structure which would easily cause cracking or fracture during drawing. Therefore, the amount was made less than the 0.05% where industrially stable handling is easy.

Further, Nb inherently lowers the hot ductility and easily causes defects in the rolling process, so addition of the minimum required amount is preferable. The amount of addition is preferably 0.03% or less, more preferably 0.015% or less.

Ti: 0.001 to Less than 0.05%

In the present invention, when adding Ti, the amount of addition should be 0.001% to less than 0.05%. Ti is a deoxidizing element and a nitride- and sulfide-forming element, so has an effect on the formation of oxides, nitrides, and sulfides. Therefore, a large amount of addition would easily cause the formation of hard oxides and nitrides, so if added incautiously, it would form hard carbides and lower the fatigue durability. In the same way as Al, in particular in high strength springs, it reduces the variation of the fatigue strength rather than the fatigue limit of springs itself. If the amount of Ti is large, the rate of fracture due to inclusions becomes greater, so the amount has to be controlled and was made less than 0.05%.

On the other hand, Ti forms TiN in the molten steel at a high temperature, so acts to reduce the sol. N in the molten steel. In the present invention, the N is restricted so as to suppress the formation of V-based nitrides and suppress the growth of V-based undissolved carbides. For this reason, if consuming the N at a temperature of the V-based nitride formation temperature or more, it is possible to suppress the growth of V-based nitrides and V-based carbonitrides growing at the time of cooling using these as nuclei. That is, by adding Ti in a fine amount, the amount of N de facto bonding with the V is reduced, so the temperature of formation of V-based nitrides is lowered and further the V-based undissolved carbides can be suppressed.

Therefore, addition of a large amount of Ti should be avoided from the viewpoint of formation of Ti-based undissolved carbonitrides and oxides, but addition of a slight amount can lower the V-based nitride formation temperature, so rather can reduce the undissolved carbides. The amount of addition is 0.001% or more. If less than 0.001%, there is no effect of consumption of N, there is no effect of suppression of V-based undissolved carbides, and no effect of improvement of the workability is seen. However, the amount of addition of Ti is preferably 0.01% or less.

W: 0.05 to 0.5%

W improves the quenchability and acts to form carbides in steel to raise the strength, so is effective for imparting tempering softening resistance. Therefore, addition is preferable as much as possible. W forms carbides at a lower temperature compared with Ti, Nb, etc., so does not easily form undissolved carbides, but can impart tempering softening resistance by precipitation hardening. That is, it hardly remains as undissolved carbides causing harm even in the heat treatment up to the spring fabrication. On the other hand, it never causes a large drop in internal hardness even in nitridation or strain relief annealing performed at a relatively low temperature.

If the amount of addition is less than 0.05%, no effect is seen. If over 0.5%, a supercooled structure easily forms or, when industrial heat treatment is performed, conversely the ductility or other mechanical properties are liable to be impaired, so the amount of addition of W was made 0.05 to 0.5%. Further, if considering the ease of heat treatment etc., 0.1 to 0.4% is preferable. In particular, to avoid a supercooled structure right after rolling or other trouble and obtain the maximum limit of tempering softening resistance, addition of 0.15% or more is more preferable.

Mo: 0.05 to 0.5%

Mo improves the quenchability and precipitates as carbides at a heat treatment temperature of a relatively low temperature of the extent of tempering and nitridation temperature, so can easily give tempering softening resistance. Therefore, it is possible to give a high strength without softening even after high temperature tempering or strain relief annealing, nitridation, or other heat treatment performed in accordance with need before spring fabrication. This suppresses the drop in spring internal hardness after nitridation, so increases the effect of hot setting or strain relief annealing and improves the fatigue characteristics of the final spring. Specifically, it is possible to make the tempering temperature at the time of controlling the strength a high temperature. This making the tempering temperature a high temperature has the effect of making the grain boundary carbides precipitating in a film shape spherical by tempering at a high temperature and reducing the grain boundary area ratio. This is advantageous for securing the grain boundary strength and improving the delayed fracture and embrittlement fracture characteristics.

Mo forms Mo-based carbides separate from cementite in the steel. In particular, compared with V etc., the precipitation temperature is low, so there is the effect of suppressing coarsening of the carbides. If the amount of addition is less than 0.05%, the effect cannot be recognized. However, if the amount of addition is large, it is preferable to patent the steel material in advance at the time of drawing so as to make it a ferrite-pearlite structure. Despite this, a supercooled structure easily occurs due to the softening heat treatment before rolling or drawing etc. and cracking or fracture at the time of drawing is easily caused. This is because Mo is an element greatly imparting quenchability, so if the amount of addition becomes large, the time until the end of the pearlite transformation becomes long, the temperature cannot be maintained until the end of transformation at the time of cooling after rolling or in the patenting process, a supercooled structure easily occurs and causes fracture at the time of drawing, or when not breaking and remaining as internal cracks, the characteristics of the final product are greatly degraded. From this, if Mo is over 0.5%, the quenchability increases and industrially obtaining a ferrite-pearlite structure becomes difficult, so this is made the upper limit. To suppress the formation of a martensite structure reducing the producibility in the rolling, drawing, or other manufacturing process and facilitate industrially stable rolling and drawing, the content is preferably made 0.4% or less, more preferably 0.2% or so.

Compared with V, Nb, and Ti having the effects of strengthening the tempering softening resistance in the same way as W and Mo, V, Nb, and Ti, as explained above, form nitrides and further cause easy growth of carbides using these as nuclei, while W and Mo do not form nitrides much at all, so can be added and strengthen the softening resistance without being affected by the amount of N. That is, V, Nb, and Ti can also strengthen the softening resistance, but if added for strengthening the softening resistance while avoiding undissolved carbides, the amount of addition ends up being inherently restricted. Therefore, when not forming undissolved carbides and requiring higher softening resistance, addition of W or Mo, which do not form nitrides, precipitate as carbides at a relatively low temperature, and function as precipitation strengthening elements, is extremely effective.

Ta: 0.001 to 0.5%

Ta forms nitrides, carbides, and composite precipitates and is effective for imparting tempering softening resistance and securing toughness by reducing the γ-grain size. If the amount of addition is less than 0.001%, the effect is not clear, while if over 0.5%, coarse nitrides, carbides, and their composite precipitates are formed and impair the workability etc., so this was made the upper limit.

Further, one or more of Ni, Cu, Co, and B is added to secure strength by matrix hardening when trying to achieve both strength and workability and the optimum balance of the softening resistance and workability due to carbide control cannot be obtained.

Ni: 0.05 to 3.0%

Ni does not form carbides or other precipitates, but can improve the quenching ability and stably increase the strength by heat treatment. Further, it can improve the ductility of the matrix and improve the coilability. However, with quenching and tempering, it increases the residual austenite, so the material is inferior in terms of setting of spring formation or uniformity of the material. If the amount of addition is 0.05% or less, no effect can be recognized in increasing the strength and improving the ductility. On the other hand, addition of a large amount of Ni is not preferable. At 3.0% or more, problems such as an increase in residual austenite becomes remarkable, the effect of improvement of the quenching ability and improvement of the ductility become saturated, and there are cost disadvantages etc. Residual austenite changes to martensite by work induced transformation when deformation is introduced and breaks down even with relatively low temperature treatment, so a stable material is difficult to maintain, so the less the better. For this reason, it is not preferable to excessively add Ni—which easily causes residual austenite to remain.

Cu: 0.05 to 0.5%

Addition of Cu is effective for preventing the decarburization lowering the spring fatigue life after spring fabrication. Further, like Ni, it has the effect of improving the corrosion resistance. Usually, to stabilize the wire diameter and remove the decarburized layer, the surface layer is removed by peeling. By suppressing the decarburized layer, it is possible to improve the fatigue life of the spring and eliminate the peeling step. The effect of Cu in suppressing decarburization and the effect in improving the corrosion resistance can be exhibited when 0.5% or more. As explained later, even if adding Ni, if over 0.5%, embrittlement easily causes rolling defects. Therefore, the lower limit was made 0.05% and the upper limit was made 0.5%. The addition of Cu does not detract much at all from the mechanical properties at room temperature, but even if adding Cu over 0.3%, the hot ductility is degraded, so sometimes the billet surface cracks during rolling. For this reason, the amount of addition of Ni for preventing cracking during rolling is preferably made [Cu %]< [Ni %] in accordance with the amount of addition of Cu. In the range of Cu of 0.3% or less, rolling defects are not caused, so it is not necessary to limit the amount of addition of Ni for the purpose of preventing rolling defects.

Co: 0.05 to 3.0%

Co reduces the quenching ability in some cases, but improves the high temperature strength. Further, to inhibit the growth of carbides, it acts to suppress the formation of coarse carbides which become a problem in the present invention. Therefore, it is possible to suppress the coarsening of the carbides including cementite. Therefore, addition is preferable. When added, if 0.05% or less, the effect is small. However, if added in a large amount, the ferrite phase increases in hardness and reduces the ductility, so the upper limit was made 3.0%. This industrially gives a stable performance at 0.5% or less.

B: 0.0005 to 0.006%

B is an element improving the quenching ability and has an effect of cleaning the austenite grain boundaries. The addition of B renders harmless the P, S, and other elements segregating at the grain boundary and reducing the toughness and therefore improves the fracture characteristics. At this time, the effect is lost if the B bonds with N and forms BN. The lower limit of the amount of addition is made 0.0005% where the effect becomes clear, while the upper limit is made 0.0060% where the effect becomes saturated. However, if even a little amount of BN is formed, it causes embrittlement, so full consideration is required so as to not produce BN. Therefore, preferably the amount is 0.003 or less. More preferably, it is effective to immobilize the free N by the Ti or other nitride-forming elements and make the amount of B 0.0010 to 0.0020%.

These Ni, Cu, Co, and B are mainly effective for strengthening the ferrite phase of the matrix. They are elements effective for securing strength by matrix strengthening when trying to achieve both strength and workability simultaneously and the optimum balance of softening resistance and workability cannot be obtained by carbide control.

Al: Restricted to 0.005% or Less

Al is a deoxidizing element and has an effect on formation of oxides. In particular, in high strength valve springs, $Al_2O_3$ and other hard oxides easily form fracture starting points, so it is necessary to avoid this. Therefore, it is important to strictly control the amount of Al. In particular, when the tensile strength of the heat treated steel wire would exceed 2100 MPa, strict control of the oxide-forming elements is essential for reducing the variation in fatigue strength.

In the present invention, Al is prescribed as being 0.005% or less. This is because if over 0.005%, oxides of mainly $Al_2O_3$ would easily form, so fracture would result due to the oxides and sufficient fatigue strength and stability of quality would not be able to be secured. Further, when requiring a high fatigue strength, the content is preferably made 0.003% or less.

Further, one or more of Te, Sb, Mg, Zr, Ca, and Hf are added as elements for controlling the form of the oxides and sulfides when further higher performance and more stable performance are sought.

Te: 0.0002 to 0.01%

Te has the effect of making MnS spherical. If less than 0.0002%, the effect is not clear, while if over 0.01%, the matrix falls in toughness, hot cracking occurs, the fatigue durability is reduced, and other remarkable problems occur, so 0.01% is made the upper limit.

Sb: 0.0002 to 0.01%

Sb has the effect of making MnS spherical. If less than 0.0002%, the effect is not clear, while if over 0.01%, the matrix falls in toughness, hot cracking occurs, the fatigue durability is reduced, and other remarkable problems occur, so 0.01% is made the upper limit.

Mg: 0.0001 to 0.0005%

Mg forms oxides in molten steel of a temperature higher than the MnS formation temperature. These are already present in the molten steel at the time of MnS formation. Therefore, they can be used as nuclei for precipitation of MnS. Due to this, the distribution of MnS can be controlled. Further, looking at the number distribution as well, Mg-based oxides are dispersed in the molten steel more finely than the Si- and Al-based oxides often seen in conventional steel, so the MnS precipitated using the Mg-based oxides as nuclei finely disperses in the steel. Therefore, even with the same S content, the distribution of MnS differs depending on the presence or absence of Mg. Addition of these results in a finer MnS grain size. This effect is sufficiently obtained even in a small amount. If Mg is added, MnS is made finer. However, if exceeding 0.0005%, not only are hard oxides easily formed, but also MgS and other sulfides start to be formed so a drop in the fatigue strength and a drop in the coilability are invited. Therefore, the amount of addition of Mg was made 0.0001 to 0.0005%. When used for a high strength spring, an amount of 0.0003% or less is preferable. The amount of the element is small, but about 0.0001% can be added by making liberal use of Mg-based refractories. Further, Mg may be added by carefully selecting the secondary materials and using secondary materials with small Mg contents.

Zr: 0.0001 to 0.0005%

Zr is an oxide- and sulfide-forming element. Oxides are finely dispersed in the spring steel, so like Mg, form nuclei for precipitation of MnS. Due to this, the fatigue durability is improved and the ductility is increased to improve the coilability. If less than 0.0001%, this effect is not seen. Further, even if added over 0.0005%, formation of hard oxides is promoted, so even if the sulfides finely disperse, trouble due to oxides easily occurs. Further, with large addition, not only oxides, but also ZrN, ZrS, and other nitrides and sulfides are formed and cause trouble in production or a drop in the fatigue durability property of the spring, so the amount was made 0.0005% or less. Further, when using this for a high strength spring, the amount of addition is preferably made 0.0003% or less. These elements are small in amount, but can be controlled by careful selection of the secondary materials and precisely controlling the refractories etc. For example, if making liberal use of Zr refractories in locations in contact with molten steel for a long time such as the ladle, tundish, nozzle, etc., it is possible to add 1 ppm or so with respect to 200 tons or so of molten steel. Further, while considering this, it is possible to add secondary materials so as not to exceed a prescribed range.

The method of analysis of Zr in the steel is to sample 2 g from the part of the steel material being measured free from the effect of surface scale, treat the sample by the same method as in Attachment 3 of JIS G 1237-1997, then measure it by ICP. At this time, the calibration line in ICP is set to be suitable for the fine amount of Zr.

Ca: 0.0002 to 0.01%

Ca is an oxide- and sulfide-forming element. In spring steel, by making MnS spherical, the length of MnS, which serves as a starting point of fatigue and other fracture, can be suppressed to make it harmless. The effect becomes unclear if less than 0.0002%. Further, even if added over 0.01%, not only is the yield poor, but also oxides or CaS or other sulfides are formed and cause trouble in production or a drop in the fatigue durability property of the spring, so the amount was made not more than 0.01%. The amount of addition is preferably not more than 0.001%.

Hf: 0.0002 to 0.01%

Hf is an oxide-forming element and forms the nuclei of precipitation of MnS. For this reason, Hf is an element forming oxides and sulfides by fine dispersion. In spring steel, the oxides are finely dispersed, so like Mg, form nuclei of precipitation of MnS. Due to this, the fatigue durability is improved and the ductility is increased to improve the coilability. This effect is not clear if the amount is less than 0.0002%. Further, even if over 0.01% is added, the yield is poor. Not only this, but also oxides or HfN, HfS, or other nitrides and sulfides are formed and cause production trouble or a drop in the fatigue durability property of the spring, so the amount was made 0.01% or less. This amount of addition is preferably 0.003% or less.

Below, the preferable ranges of content of other compositions will be explained.

P: 0.015% or Less

While P and S are not limited in the present invention, they have to be restricted. P causes the steel to harden. Further, it segregates and makes the material brittle. The P segregating at the austenite grain boundaries causes a drop in the impact value and delayed fracture due to entry of hydrogen. For this reason, the smaller the amount the better. Therefore, P was limited to 0.015% or less where the embrittlement tends to become remarkable. Further, in the case of a high strength where the tensile strength of the heat treated steel wire exceeds 2150 MPa, a content of less than 0.01% is preferable.

S: 0.015% or Less

S, like P, causes the steel to become brittle when present in steel. Mn reduces its effect sharply, but MnS also takes the form of inclusions, so lowers the fracture characteristic. In particular, in high strength steel, a small amount of MnS sometimes causes fracture. Therefore, it is preferable to reduce the S as much as possible. 0.015%, where this detrimental effect becomes remarkable, was therefore made the upper limit. Further, in the case of a high strength where the tensile strength of the heat treated steel wire exceeds 2150 MPa, the amount is preferably made less than 0.01%.

t-O: 0.0002 to 0.01

In the steel, oxides formed through the deoxidation process and dissolved O are present. However, if the total amount of this total-oxygen (t-O) is large, it means that there are many oxide-based inclusions. If the oxide-based inclusions are small in size, the spring performance is not affected, but if a large amount of large oxides are present, the spring performance will be greatly affected.

If the amount of oxygen exceeds 0.01%, the spring performance is remarkably reduced, so the upper limit is preferably made 0.01%. Further, the smaller the amount of oxygen the better, but even if less than 0.0002%, the effect is saturated, so this is preferably made the lower limit. If considering the ease of the actual deoxidation process etc., the content is preferably adjusted to 0.0005 to 0.005%.

Therefore, the following provision is added regarding the alloy-based spherical carbides and cementite-based spherical carbides on this examined surface. The following provisions are important for eliminating the harm due to these.

Prior Austenite Grain Size Number of #10 or More

In steel wire basically comprised of a tempered martensite structure, the prior austenite grain size has a major effect on the basic properties of the steel wire along with the carbides. That is, the smaller the prior austenite grain size, the better the fatigue characteristics and coilability. However, no matter how small the austenite grain size, if the carbides are included in a greater amount than prescribed, the effect is small. In general, to make the austenite grain size smaller, it is effective to reduce the heating temperature at the time of quenching, but this conversely increases the undissolved spherical carbides. Therefore, it is important to finish the steel wire into wire with a balance of the amount of carbides and prior austenite grain size. Here, when the carbides satisfy the above provision, if the prior austenite grain size number is less than #10, sufficient fatigue characteristics and coilability cannot be obtained, so the prior austenite grain size number is prescribed as being #10 or higher. Further, for application to a high strength spring, a further finer grain size is preferable. By making it #11 or further #12 or more, both high strength and coilability can be achieved.

Residual Austenite of 15 Mass % or Less

Residual austenite often remains at the segregated parts, prior austenite grain boundaries, or near the regions sandwiched between sub grains. Residual austenite becomes martensite due to work-induced transformation. If induced transformation occurs at the time of spring fabrication, locally high hardness parts will be formed in the material and rather the coiling characteristics of the spring will be lowered. Further, recent springs are strengthened on their surfaces by shot peening, setting, and other plastic deformation, but in a production process including a number of such processes giving plastic deformation, the work-induced martensite formed at an early stage would lower the fracture strain and lower the workability and fracture characteristics of the spring during use. Further, even when industrially unavoidable deformation such as bruising is introduced, the material will easily fracture during coiling. Further, by gradually breaking down in the nitridation, strain relief annealing, or other heat treatment, it will cause a change in the mechanical properties, lower the strength, reduce the coilability, and cause other trouble. Therefore, the residual austenite is reduced as much as possible to suppress the formation of work-induced martensite and thereby improve the workability. Specifically, if the amount of residual austenite exceeds 15% (mass %), the sensitivity to bruising etc. will become higher and the material will easily fracture during coiling or other handling, so the content was restricted to 15% or less.

The amount of residual austenite changes depending on the amounts of addition of C, Mn, and other alloy elements and the heat treatment conditions. For this reason, not only the design of the compositions, but also the improvement of the heat treatment conditions are important.

When the martensite formation temperature (start temperature Ms point and finish temperature Mf point) becomes a low temperature, unless made a considerably low temperature at the time of quenching, martensite will not be formed and residual austenite will easily remain. In industrial quenching, water or oil is used, but to suppress residual austenite, sophisticated heat treatment control becomes necessary. Specifically, control becomes necessary to maintain the cooling medium at a low temperature, maintain an extremely low temperature even after cooling, secure a long transformation time to martensite, etc. Industrially, the material is processed on a continuous line, so the temperature of the cooling medium easily rises to close to 100° C., but it is preferable to maintain it at 60° C. or less. Further, a low temperature of 40° C. or less is more preferable. Further, to sufficiently promote martensite transformation, it is necessary to hold the material in the cooling medium for 1 second or more. Securing the holding time after cooling is also important.

Further, in addition to the provisions on the carbides etc., a structure in which the distribution of carbides is smaller than in other parts should be avoided. Specifically, in a lenticular martensite or its tempered structure, the distribution of carbides is smaller than in other parts and the microstructure is uneven, so the fatigue strength and workability are detrimentally affected.

EXAMPLES

Below, examples will be used to explain the present invention in detail.

Example 1

To clarify the effects of the present invention, a material prepared in a 16 kg vacuum melting furnace was tested for its characteristics.

Steel of each of the chemical compositions shown in Table 1 was measured for tensile strength and impact value after quenching and tempering. The impact value is the general fracture property. Furthermore, for the present invention, this is considered an indicator of the basic toughness as a spring and workability. It is desirable to achieve both tensile strength and toughness. Steel of each of the chemical compositions shown in Table 1 was produced in a 16 kg vacuum melting furnace, forged to $\phi$13 mm, then normalized, patented, quenched, and tempered. The steel was heated at a normalization temperature of 1210° C.×1 hr→gradual cooling for patenting and was quenched and tempered at a quenching temperature of 910° C. and a tempering temperature of 520° C. After this, the material was further annealed at the temperature described in the table×60 min and heat treated simulating strain relief and nitridation. The tensile characteristics were evaluated—including for materials with no annealing. After heat treatment, test pieces were cut out and evaluated for various characteristics. The heat treatment conditions and characteristics are shown in Table 2.

In the present invention, the Fe-based carbides are controlled so as to achieve both strength and toughness (workability). The Si having a great effect on the Fe carbide formation behavior was changed and the behavior evaluated. As a result, when the amount of Si is insufficient, cementite forms and the steel becomes embrittled even at a relatively low tempering temperature. At this time, the concentration of Fe in the electrolytic extraction residue becomes high and exceeds the provision. In these cases, in the comparative examples, a large amount of cementite is formed, so the impact value becomes inferior. In addition, it is learned that even under conditions where heating is insufficient and a large amount of undissolved carbides are formed, the impact value is decreased and sufficient workability cannot be secured. By measuring the amount of Fe in the electrolysis residue in this way, the characteristics of the steel can be grasped.

TABLE 1

| Ex. | No. | Chemical compositions (mass %) | | | | | | | | | | | | |
|---|---|---|---|---|---|---|---|---|---|---|---|---|---|---|
| | | C | Si | Mn | P | S | N | Cr | V | Al | Ta | Nb | Mo | W |
| Inv. ex | 1 | 0.63 | 2.00 | 0.55 | 0.006 | 0.005 | 0.0032 | 1.08 | | | | | | |
| Comp. ex | 2 | 0.63 | 2.00 | 0.55 | 0.006 | 0.005 | 0.0032 | 1.08 | | | | | | |
| Inv. ex | 3 | 0.63 | 2.29 | 0.51 | 0.004 | 0.006 | 0.0031 | 1.37 | 0.07 | | | | | |
| Comp. ex | 4 | 0.63 | 2.29 | 0.51 | 0.004 | 0.006 | 0.0031 | 1.37 | 0.07 | | | | | |
| Inv. ex | 5 | 0.61 | 2.44 | 0.62 | 0.005 | 0.010 | 0.0031 | 1.27 | | | | | 0.18 | |
| Comp. ex | 6 | 0.61 | 2.44 | 0.62 | 0.005 | 0.010 | 0.0031 | 1.27 | | | | | 0.18 | |
| Inv. ex | 7 | 0.60 | 2.43 | 0.73 | 0.004 | 0.009 | 0.0034 | 1.03 | | | | 0.020 | | |
| Comp. ex | 8 | 0.60 | 2.43 | 0.73 | 0.004 | 0.009 | 0.0034 | 1.03 | | | | 0.020 | | |
| Inv. ex | 9 | 0.63 | 2.29 | 0.66 | 0.004 | 0.008 | 0.0034 | 1.07 | | | | | | 0.25 |
| Comp. ex | 10 | 0.63 | 2.29 | 0.66 | 0.004 | 0.008 | 0.0034 | 1.07 | | | | | | 0.25 |
| Inv. ex | 11 | 0.60 | 2.19 | 0.79 | 0.006 | 0.003 | 0.0032 | 1.15 | | | 0.060 | | | |
| Comp. ex | 12 | 0.60 | 2.19 | 0.79 | 0.006 | 0.003 | 0.0032 | 1.15 | | | 0.060 | | | |
| Inv. ex | 13 | 0.63 | 2.14 | 0.72 | 0.006 | 0.006 | 0.0037 | 1.11 | | 0.028 | | | | |
| Comp. ex | 14 | 0.63 | 2.14 | 0.72 | 0.006 | 0.006 | 0.0037 | 1.11 | | 0.028 | | | | |
| Inv. ex | 15 | 0.61 | 2.36 | 0.63 | 0.003 | 0.003 | 0.0035 | 1.39 | 0.07 | | | 0.008 | 0.16 | |
| Comp. ex | 16 | 0.61 | 2.36 | 0.63 | 0.003 | 0.003 | 0.0035 | 1.39 | 0.07 | | | 0.008 | 0.16 | |
| Inv. ex | 17 | 0.62 | 2.28 | 0.76 | 0.005 | 0.006 | 0.0037 | 1.07 | 0.08 | | 0.045 | 0.080 | 0.15 | |
| Comp. ex | 18 | 0.62 | 2.28 | 0.76 | 0.005 | 0.006 | 0.0037 | 1.07 | 0.08 | | 0.045 | 0.080 | 0.15 | |
| Inv. ex | 19 | 0.62 | 2.47 | 0.57 | 0.004 | 0.004 | 0.0039 | 1.42 | 0.08 | | | 0.010 | 0.16 | 0.17 |
| Comp. ex | 20 | 0.62 | 2.47 | 0.57 | 0.004 | 0.004 | 0.0039 | 1.42 | 0.08 | | | 0.010 | 0.16 | 0.17 |
| Inv. ex | 21 | 0.62 | 2.13 | 0.73 | 0.005 | 0.006 | 0.0034 | 1.21 | 0.08 | | 0.008 | 0.009 | 0.15 | |
| Comp. ex | 22 | 0.62 | 2.13 | 0.73 | 0.005 | 0.006 | 0.0034 | 1.21 | 0.08 | | 0.008 | 0.009 | 0.15 | |
| Inv. ex | 23 | 0.60 | 2.35 | 0.56 | 0.004 | 0.005 | 0.0044 | 1.24 | 0.07 | | 0.009 | 0.008 | 0.16 | 0.15 |
| Comp. ex | 24 | 0.60 | 2.35 | 0.56 | 0.004 | 0.005 | 0.0044 | 1.24 | 0.07 | | 0.009 | 0.008 | 0.16 | 0.15 |
| Inv. ex | 25 | 0.61 | 2.12 | 0.68 | 0.005 | 0.004 | 0.0036 | 1.01 | | | 0.009 | | | |
| Comp. ex | 26 | 0.61 | 2.12 | 0.68 | 0.005 | 0.004 | 0.0036 | 1.01 | | | 0.009 | | | |

TABLE 2

| Example | No. | Heat treatment conditions | | | | | | After quenching and tempering | | |
|---|---|---|---|---|---|---|---|---|---|---|
| | | Radiant tube furnace high frequency induction heating | Heating temperature | | | | | | Residual | Electrolysis filter Fe quantity % |
| | | | Soaking °C. | Normalizing °C. | Patenting °C. | Quenching °C. | Tempering °C. | γ # | γ % | |
| Inv. ex. | 1 | OT | 1250 | 1210 | 950 | 910 | 420 | 9 | 10.4 | 0.42 |
| Comp. ex. | 2 | OT | 1250 | 1210 | 950 | 910 | 520 | 9 | 10.7 | 1.78 |
| Inv. ex. | 3 | OT | 1250 | 1210 | 950 | 910 | 420 | 9 | 11.5 | 0.43 |
| Comp. ex. | 4 | OT | 1250 | 1210 | 950 | 910 | 520 | 9 | 9.6 | 1.71 |
| Inv. ex. | 5 | OT | 1250 | 1210 | 950 | 910 | 420 | 10 | 11.5 | 0.21 |
| Comp. ex. | 6 | OT | 1250 | 1210 | 950 | 910 | 520 | 10 | 8.1 | 1.68 |
| Inv. ex. | 7 | OT | 1250 | 1210 | 950 | 910 | 420 | 9 | 11.5 | 0.20 |
| Comp. ex. | 8 | OT | 1250 | 1210 | 950 | 910 | 520 | 9 | 10.2 | 1.93 |
| Inv. ex. | 9 | OT | 1250 | 1210 | 950 | 910 | 420 | 8 | 9.7 | 0.26 |
| Comp. ex. | 10 | OT | 1250 | 1210 | 950 | 910 | 520 | 8 | 9.3 | 1.59 |
| Inv. ex. | 11 | OT | 1250 | 1210 | 950 | 910 | 420 | 10 | 10.2 | 0.22 |
| Comp. ex. | 12 | OT | 1250 | 1210 | 950 | 910 | 520 | 10 | 10.2 | 1.50 |
| Inv. ex. | 13 | OT | 1250 | 1210 | 950 | 910 | 420 | 8 | 9.8 | 0.22 |
| Comp. ex. | 14 | OT | 1250 | 1210 | 950 | 910 | 520 | 8 | 8.9 | 1.89 |
| Inv. ex. | 15 | OT | 1250 | 1210 | 950 | 910 | 420 | 9 | 9.5 | 0.36 |
| Comp. ex. | 16 | OT | 1250 | 1210 | 950 | 910 | 520 | 9 | 9.6 | 1.62 |
| Inv. ex. | 17 | OT | 1250 | 1210 | 950 | 910 | 420 | 10 | 11.1 | 0.30 |
| Comp. ex. | 18 | OT | 1250 | 1210 | 950 | 910 | 520 | 10 | 11.9 | 1.65 |
| Inv. ex. | 19 | OT | 1250 | 1210 | 950 | 910 | 420 | 8 | 11.8 | 0.27 |
| Comp. ex. | 20 | OT | 1250 | 1210 | 950 | 910 | 520 | 8 | 11.3 | 1.87 |
| Inv. ex. | 21 | OT | 1250 | 1210 | 950 | 910 | 420 | 10 | 11.0 | 0.33 |
| Comp. ex. | 22 | OT | 1250 | 1210 | 950 | 910 | 520 | 10 | 9.2 | 1.57 |
| Inv. ex. | 23 | OT | 1250 | 1210 | 950 | 910 | 420 | 9 | 12.8 | 0.31 |
| Comp. ex. | 24 | OT | 1250 | 1210 | 950 | 910 | 520 | 9 | 10.3 | 1.99 |
| Inv. ex. | 25 | OT | 1250 | 1210 | 950 | 910 | 420 | 9 | 9.4 | 0.22 |

TABLE 2-continued

| Comp. ex. | 26 | OT | 1250 | 1210 | 950 | 910 | 520 | 9 | 8.6 | 1.75 |

| | | | After quenching and tempering | | | Annealing | | | |
|---|---|---|---|---|---|---|---|---|---|
| Example | No. | Hardness HV | Impact value J/cm$^2$ | Reduction of area | Annealing temperature °C. | Electrolysis filter Fe quantity % | Hardness HV | Impact value J/cm$^2$ |
| Inv. ex. | 1 | 550 | 52 | 41.4 | 425 | 0.48 | 527 | 41 |
| Comp. ex. | 2 | 497 | 30 | 32.1 | 550 | 2.12 | 479 | 37 |
| Inv. ex. | 3 | 639 | 52 | 37.2 | 425 | 0.80 | 613 | 47 |
| Comp. ex. | 4 | 609 | 29 | 34.6 | 550 | 2.04 | 592 | 34 |
| Inv. ex. | 5 | 621 | 52 | 36.0 | 425 | 0.60 | 596 | 46 |
| Comp. ex. | 6 | 617 | 33 | 31.0 | 550 | 1.99 | 602 | 34 |
| Inv. ex. | 7 | 578 | 54 | 35.4 | 425 | 0.49 | 557 | 43 |
| Comp. ex. | 8 | 537 | 31 | 28.5 | 550 | 2.12 | 521 | 34 |
| Inv. ex. | 9 | 625 | 52 | 44.6 | 425 | 0.40 | 597 | 41 |
| Comp. ex. | 10 | 609 | 32 | 33.4 | 550 | 2.03 | 592 | 37 |
| Inv. ex. | 11 | 620 | 51 | 39.2 | 425 | 0.69 | 590 | 43 |
| Comp. ex. | 12 | 525 | 29 | 31.8 | 550 | 1.73 | 508 | 34 |
| Inv. ex. | 13 | 603 | 50 | 42.0 | 425 | 0.60 | 581 | 47 |
| Comp. ex. | 14 | 527 | 28 | 28.7 | 550 | 2.34 | 508 | 35 |
| Inv. ex. | 15 | 639 | 52 | 43.7 | 425 | 0.39 | 610 | 47 |
| Comp. ex. | 16 | 602 | 22 | 32.2 | 550 | 1.87 | 586 | 33 |
| Inv. ex. | 17 | 640 | 54 | 43.3 | 425 | 0.53 | 619 | 47 |
| Comp. ex. | 18 | 618 | 23 | 33.7 | 550 | 1.87 | 598 | 33 |
| Inv. ex. | 19 | 658 | 54 | 40.8 | 425 | 0.32 | 632 | 42 |
| Comp. ex. | 20 | 599 | 27 | 30.9 | 550 | 1.93 | 583 | 35 |
| Inv. ex. | 21 | 642 | 59 | 45.3 | 425 | 0.15 | 612 | 49 |
| Comp. ex. | 22 | 598 | 25 | 31.7 | 550 | 1.79 | 591 | 32 |
| Inv. ex. | 23 | 648 | 55 | 42.8 | 425 | 0.35 | 636 | 41 |
| Comp. ex. | 24 | 609 | 26 | 31.9 | 550 | 2.93 | 585 | 33 |
| Inv. ex. | 25 | 581 | 53 | 49.2 | 425 | 0.57 | 560 | 41 |
| Comp. ex. | 26 | 515 | 33 | 30.8 | 550 | 2.73 | 506 | 31 |

(Note)
Electrolysis filter Fe quantity: [Amount of Fe in residue on 0.2 μm filter]/[Steel electrolysis amount] × 100

Example 2

Tables 3 to 6 show lists of examples and results of their evaluation. After that, the heat histories of the invention examples were shown. In part of the comparative examples, heat treatment different from that was performed, for example, treatment was performed under conventional general conditions deliberately so as to show the effects of the invention. These detailed conditions are explained in Table 3 and 5 for the chemical compositions of the steel and in Tables 4 and 6 for the heat treatment conditions and characteristics.

The materials of the present invention were produced by (a) a 270 ton converter (Example 22) and (b) a 16 kg vacuum melting furnace (other examples).

The materials produced by the 270 ton converter were heated to 1250 to 1300° C. and rolled to prepare billets. At this time, the temperature was sufficiently raised so as to make the structures of the steel bloom uniform and to make the V and other carbide-forming elements sufficiently dissolve.

Further, the billets were rolled to prepare the spring-use steel wire materials. At this time, in the invention examples, the materials were held for a constant time at high temperatures of 1200° C. or more. After this, in each case, the billets were rolled to ϕ8 mm.

In the other examples, the materials were melted by a 16 kg vacuum melting furnace, then forged to ϕ13 mm×600 mm, then heat treated. After this, they were held at 1300° C.×3 hr or more to again make the V and other carbide-forming elements sufficiently dissolve. After this, the materials were again held at high temperatures of 1200° C. or more for a certain time.

In the cooling process at the time of rolling or after rolling simulation, to suppress the formation of martensite or other hard, easily crackable supercooled structures, the material was cooled from the high temperature at the time of rolling to 450° C., then was gradually cooled by covering it etc. Even if a supercooled structure resulted from this, softening was possible, no cracks or defects were caused in the later processes as well, and handling was easy.

Heat Treatment of Wire Materials (Pretreatment)

Materials rolled or forged and given a heat history in the above way were patented, drawn, quenched, and tempered.

The materials were patented by heating at a temperature of 890° C., 950° C., 960° C.×20 min, then charged into a 600° C. Pb tank and converted to a ferrite-pearlite structure. At this time, the pearlite transformation was ended in the patenting tank in an extremely short time. In this state, the materials were drawn by dies to ϕ4 mm.

Quenching and Tempering

The quenching and tempering were performed by both (1) radiant tube furnace heating and (2) high frequency induction heating.

(1) Radiant Tube Furnace Heating

A material is charged into a radiant tube furnace heated to 920° C., then 10 minutes later is charged into a 50° C. oil tank and quenched. After 5 minutes, it is pulled up and in that state is charged into a Pb tank adjusted to a predetermined temperature and tempered. The temperature of a lead tank is 450 to 550° C., but in the invention examples was about 420° C.

(2) High Frequency Induction Heating

In high frequency induction heating, a material is placed in a coil and heated to 900 to 1000° C. After heating, it is immediately water cooled. It can then be again heated in the coil to 400 to 600° C. to temper it. To obtain the same strength, high frequency tempering enables treatment at a high temperature. After tempering, the material is water cooled. After quenching and tempering, part is measured for the reduction of area, an indicator of tensile strength and workability, by a tensile test. At this time, the tempering temperature is controlled to give a tensile strength over 2200 MPa.

Nitridation Annealing

After quenching and tempering, each material was annealed assuming nitridation (held at [annealing temperature]×1 hr). After this, a filter was used for filtration and the amount of Fe in the residue was measured. Due to the annealing, the cementite tended to increase, so a greater amount of Fe is detected on the filter compared with before annealing. Therefore, when the amount of Fe on a 0.2 μm filter (mass %) detected after annealing is greater than that after quenching and tempering and the provision of the present invention is satisfied by measurement of the amount of Fe on the 0.2 μm filter (mass %) after annealing, the heat treated steel before annealing also satisfies the provision of the present invention.

Evaluated Matter

The matter evaluated were as follows:

(1) After quenching and tempering: tensile strength, reduction of area (workability), prior austenite grain size, amount of residual austenite, [amount of Fe on a 0.2 μm filter (mass %)], impact value (2) After annealing: [amount of Fe on a 0.2 μm filter (mass %)], hardness, tensile strength, reduction of ratio The tensile test after the quenching and tempering measured the reduction of area—an indicator of tensile strength and spring workability. Basically, each material was quenched and tempered to exceed 2200 MPa, then a JIS Z 2201 No. 9 test piece was prepared and was tested in accordance with JIS Z 2241. The tensile strength was calculated from the fracture load.

Further, in recent years, springs have often been made higher in strength by hardening by nitridation of the surface layer. Nitridation heats a spring in a nitridation atmosphere gas to 400 to 500° C. and holds it there for several minutes to 1 hour or so in order to make the surface layer harden. At that time, the inside where the nitrogen has not penetrated is heated, so is annealed and softened. Suppressing this softening is important. The hardness (indicator of softening resistance), tensile strength, and yield point after annealing simulating nitridation were evaluated.

Nitrided and annealed steel is a material similar to the inside of a spring. Its high yield point means superior spring durability. Further, in actual springs, shot peening to impart compressive residual stress is becoming a general practice, but the compressive residual stress becomes greater proportionally to the yield point. A large yield point means a large compressive residual stress and further a deep residual stress layer as well. In this way, the ease by which compressive residual stress can remain is also one factor increasing the durability of an actual spring.

Tensile Test Method

The tensile test was performed in accordance with the JIS. An elastometer was attached and pulled to measure both the yield point and tensile strength. When the yield point was unclear, the 0.2% yield strength was measured as the yield point. Further, the reduction of area was measured and used as an indicator for evaluating the workability.

Explanation of Results

Tables 1 and 2 show invention examples and comparative examples. The examples obtained by using materials of the same compositions and changing only the tempering temperature so as to prepare two levels of examples and by tempering these at a low temperature (420° C.) are the invention examples (Examples 1, 3, 5, 7, 9, 11, 13, 15, 17, 19, 21, 23, 25), while the examples obtained by tempering at a high temperature (520° C.) are the comparative examples (Comparative Examples 2, 4, 6, 8, 10, 12, 14, 16, 18, 20, 22, 24, 26).

The hardness is finished to a level which differs for each chemical composition, but the invention examples obtained by filtering the electrolytic solution and having an amount of Fe in the residue on the 0.2 μm filter as prescribed are higher in hardness than the comparative examples and are hard, but the impact value is improved. Further, the reduction of area, which is an indicator of workability, is improved somewhat and the toughness and workability are superior regardless of the high strength. In the comparative examples, because much cementite was precipitated and grown, the amount of Fe on the filter was great. The steel was soft and insufficient even in the strength and all of strength, toughness, and workability were inferior.

In Tables 3 to 6, furthermore, the heat treatment rate was considered, heat treatment was performed simulating actual industrial oil tempering (radiant tube furnace (OT) treatment, high frequency induction heating treatment (IQT)), annealing was performed simulating nitridation, and the effects of the compositions were evaluated. To adjust the heat treatment rate to the oil tempering, the material was melted, forged, then drawn to φ4 mm to enable high speed, short time heat treatment.

The cause of the increase in the amount of Fe on the 0.2 μm filter after electrolysis, the point of the present invention, is believed to be the large formation of cementite and the undissolved carbides. When both are inhibited, good heat treated steel simultaneously possessing strength and workability could be obtained. The same is true in the evaluation of the materials after annealing. As seen in Invention Examples 27 to 67, if the amount of Fe in the residue on the filter is small, the springs do not become brittle, and a good toughness can be obtained even at a high strength. Despite the quenching and tempering conditions differing depending on the radiant tube furnace treatment (OT) and high-frequency induction heating treatment (IQT), this trend remains the same. That is, high-frequency induction heating treatment, compared with the radiant tube furnace treatment, involves a higher heating temperature in quenching and tempering and a shorter time of treatment. If the amount of Fe in the residue on the filter can be suppressed, high strength and high toughness can be obtained.

On the one hand, the comparative examples shown by Nos. 68 to 81 were produced under the conditions where cementite and undissolved carbides easily remain due to the thermal histories after melting of the steel. The amounts of Fe in the residue after electrolytic extraction were large and there were problems in strength, brittleness, and workability.

That is, these were examples where the treatment temperature in the intermediate processes up to manufacture was low and undissolved carbides remained and where the tempering temperature was high and much cementite was formed. Strength, toughness and workability could not all be achieved due to these inadequate thermal histories.

Furthermore, Comparative Examples 80 and 81 are examples where the austenite grain size was too large and where the residual austenite was too great. When raising the heating temperature during quenching, no undissolved carbides were recognized and the amounts of Fe in the electrolytic extraction residue were small, but the hardness and workability were inferior to the invention examples. Further, when the residual austenite was great, workability was inferior in environments where cracks and the like occur.

TABLE 3

| Example | No. | Chemical compositions (mass %) | | | | | | | | | | | | |
|---|---|---|---|---|---|---|---|---|---|---|---|---|---|---|
| | | C | Si | Mn | P | S | N | Cr | V | Al | Ti | Nb | Mo | W |
| Inv. ex. | 27 | 0.62 | 2.33 | 0.51 | 0.006 | 0.010 | 0.0034 | 1.23 | | 0.001 | | 0.010 | 0.14 | 0.23 |
| Inv. ex. | 28 | 0.64 | 1.96 | 0.51 | 0.005 | 0.011 | 0.0033 | 0.75 | | 0.001 | | 0.011 | 0.10 | 0.13 |
| Inv. ex. | 29 | 0.63 | 2.33 | 0.62 | 0.007 | 0.006 | 0.0039 | 0.98 | | 0.003 | | 0.010 | 0.13 | 0.25 |
| Inv. ex. | 30 | 0.74 | 2.34 | 0.48 | 0.007 | 0.004 | 0.0032 | 0.87 | | 0.002 | | 0.009 | 0.14 | 0.24 |
| Inv. ex. | 31 | 0.63 | 2.42 | 0.62 | 0.006 | 0.008 | 0.0031 | 0.62 | | 0.003 | | 0.010 | 0.11 | 0.18 |
| Inv. ex. | 32 | 0.52 | 2.46 | 0.70 | 0.005 | 0.002 | 0.0036 | 0.59 | | 0.003 | | 0.008 | 0.13 | 0.30 |
| Inv. ex. | 33 | 0.73 | 1.95 | 0.55 | 0.009 | 0.002 | 0.0038 | 0.80 | | 0.001 | | 0.010 | 0.16 | 0.32 |
| Inv. ex. | 34 | 0.58 | 2.07 | 0.47 | 0.009 | 0.004 | 0.0038 | 0.93 | | 0.003 | | 0.010 | 0.18 | 0.18 |
| Inv. ex. | 35 | 0.52 | 2.00 | 0.59 | 0.008 | 0.010 | 0.0037 | 1.07 | | 0.002 | | 0.009 | 0.11 | 0.33 |
| Inv. ex. | 36 | 0.59 | 2.50 | 0.63 | 0.004 | 0.004 | 0.0035 | 0.85 | | 0.003 | | 0.010 | 0.13 | 0.27 |
| Inv. ex. | 37 | 0.72 | 2.34 | 0.61 | 0.010 | 0.011 | 0.0038 | 0.92 | | 0.002 | | 0.008 | 0.10 | 0.14 |
| Inv. ex. | 38 | 0.67 | 2.44 | 0.70 | 0.005 | 0.009 | 0.0032 | 0.68 | | 0.002 | | 0.010 | 0.12 | 0.27 |
| Inv. ex. | 39 | 0.75 | 2.17 | 0.62 | 0.004 | 0.010 | 0.0030 | 1.29 | | 0.001 | | 0.010 | 0.17 | 0.29 |
| Inv. ex. | 40 | 0.66 | 2.11 | 0.54 | 0.007 | 0.005 | 0.0034 | | | 0.002 | | 0.009 | 0.11 | 0.18 |
| Inv. ex. | 41 | 0.67 | 1.80 | 0.25 | 0.007 | 0.005 | 0.0028 | 1.24 | | 0.002 | | 0.007 | 0.11 | 0.20 |
| Inv. ex. | 42 | 0.63 | 2.01 | 0.26 | 0.002 | 0.003 | 0.0038 | 1.10 | | 0.001 | | | 0.17 | 0.16 |
| Inv. ex. | 43 | 0.66 | 2.11 | 0.28 | 0.003 | 0.005 | 0.0034 | 1.11 | | 0.003 | 0.004 | 0.001 | 0.12 | 0.20 |
| Inv. ex. | 44 | 0.62 | 1.82 | 0.15 | 0.008 | 0.008 | 0.0021 | 1.28 | | 0.002 | | | 0.15 | 0.21 |
| Inv. ex. | 45 | 0.64 | 2.15 | 0.26 | 0.002 | 0.008 | 0.0054 | 1.39 | | 0.001 | | 0.004 | | 0.19 |
| Inv. ex. | 46 | 0.58 | 2.20 | 0.12 | 0.004 | 0.003 | 0.0029 | 1.17 | | 0.001 | | 0.005 | 0.15 | |
| Inv. ex. | 47 | 0.67 | 1.92 | 0.42 | 0.002 | 0.004 | 0.0025 | 1.26 | | 0.003 | | 0.002 | 0.14 | 0.14 |
| Inv. ex. | 48 | 0.60 | 2.04 | 0.77 | 0.002 | 0.009 | 0.0036 | 1.24 | | 0.001 | | 0.009 | 0.12 | 0.14 |
| Inv. ex. | 49 | 0.58 | 2.10 | 0.70 | 0.003 | 0.007 | 0.0036 | 1.11 | | 0.002 | | 0.003 | 0.16 | 0.17 |
| Inv. ex. | 50 | 0.67 | 2.00 | 0.79 | 0.008 | 0.003 | 0.0028 | 1.31 | | 0.001 | | 0.009 | 0.15 | 0.16 |
| Inv. ex. | 51 | 0.58 | 2.13 | 0.86 | 0.004 | 0.004 | 0.0053 | 1.36 | | 0.003 | | 0.004 | 0.15 | 0.22 |
| Inv. ex. | 52 | 0.61 | 2.07 | 0.47 | 0.004 | 0.009 | 0.0041 | 1.32 | | 0.003 | | 0.006 | 0.14 | 0.18 |
| Inv. ex. | 53 | 0.63 | 2.28 | 0.60 | 0.006 | 0.005 | 0.0047 | 1.43 | | 0.003 | | 0.008 | 0.15 | 0.16 |
| Inv. ex. | 54 | 0.63 | 2.26 | 0.68 | 0.005 | 0.009 | 0.0040 | 1.24 | | 0.002 | | 0.004 | 0.13 | 0.19 |
| Inv. ex. | 55 | 0.63 | 2.22 | 0.74 | 0.008 | 0.005 | 0.0019 | 1.16 | | 0.003 | | 0.002 | 0.16 | 0.21 |
| Inv. ex. | 56 | 0.61 | 2.19 | 0.80 | 0.003 | 0.005 | 0.0033 | 1.12 | | 0.002 | | 0.007 | 0.15 | 0.21 |
| Inv. ex. | 57 | 0.66 | 2.25 | 0.57 | 0.004 | 0.003 | 0.0031 | 1.09 | 0.09 | 0.002 | | 0.009 | 0.14 | 0.18 |

| Example | No. | Chemical compositions (mass %) | | | | | | | | | | |
|---|---|---|---|---|---|---|---|---|---|---|---|---|
| | | Ta | Ni | Cu | Co | B | Ca | Zr | Hf | Te | Sb | Mg |
| Inv. ex. | 27 | | | | | | | | | | | |
| Inv. ex. | 28 | | | | | | | | | | | |
| Inv. ex. | 29 | | | | | | | | | | | |
| Inv. ex. | 30 | | | | | | | | | | | |
| Inv. ex. | 31 | | | | | | | | | | | |
| Inv. ex. | 32 | | | | | | | | | | | |
| Inv. ex. | 33 | | | | | | | | | | | |
| Inv. ex. | 34 | | | | | | | | | | | |
| Inv. ex. | 35 | | | | | | | | | | | |
| Inv. ex. | 36 | | | | | | | | | | | |
| Inv. ex. | 37 | | | | | | | | | | | |
| Inv. ex. | 38 | | | | | | | | | | | |
| Inv. ex. | 39 | | | | | | | | | | | |
| Inv. ex. | 40 | | | | | | | | | | | 0.0004 |
| Inv. ex. | 41 | | | | | | | | | | | 0.0003 |
| Inv. ex. | 42 | | | | | | | | | | | 0.0002 |
| Inv. ex. | 43 | | | | | | | | | | | 0.0003 |
| Inv. ex. | 44 | | | | | | | | | | | 0.0002 |
| Inv. ex. | 45 | | | | | | | | | | | |
| Inv. ex. | 46 | | | | | | | | | | | 0.0005 |
| Inv. ex. | 47 | | 0.2 | | | | | | | | | 0.0004 |
| Inv. ex. | 48 | | | 0.07 | | | | | | | | 0.0004 |
| Inv. ex. | 49 | | | | 0.15 | | | | | | | 0.0004 |
| Inv. ex. | 50 | | | | | 0.0006 | | | | | | 0.0005 |
| Inv. ex. | 51 | | | | | | 0.0005 | | | | | 0.0005 |
| Inv. ex. | 52 | | | | | | | | 0.0005 | | | 0.0005 |
| Inv. ex. | 53 | | | | | | | | | 0.002 | | 0.0003 |
| Inv. ex. | 54 | | | | | | | | | | 0.001 | 0.0002 |
| Inv. ex. | 55 | | | | | | | | | | | 0.0004 |
| Inv. ex. | 56 | | | | | | 0.0004 | | | | | 0.0004 |
| Inv. ex. | 57 | 0.02 | | | | | | | | | | 0.0004 |

TABLE 4

| Ex. | No. | Heat treatment conditions | | | | | | After quenching and tempering | | |
|---|---|---|---|---|---|---|---|---|---|---|
| | | Radiant tube furnace high frequency induction heating | Heating temperature | | | | | Residual | | Electrolysis filter Fe quantity |
| | | | Soaking ° C. | Normalizing (rolling)° C. | Patenting ° C. | Quenching ° C. | Tempering ° C. | γ # | γ % | |
| Inv. ex. | 27 | OT | 1250 | 1210 | 950 | 910 | 420 | 11 | 11.0 | 0.33 |
| Inv. ex. | 28 | OT | 1250 | 1210 | 950 | 910 | 420 | 11 | 10.7 | 0.45 |
| Inv. ex. | 29 | OT | 1250 | 1210 | 950 | 910 | 420 | 12 | 9.0 | 0.34 |
| Inv. ex. | 30 | OT | 1250 | 1210 | 960 | 910 | 420 | 11 | 9.7 | 0.46 |
| Inv. ex. | 31 | OT | 1250 | 1210 | 960 | 910 | 420 | 11 | 10.1 | 0.31 |
| Inv. ex. | 32 | OT | 1250 | 1210 | 960 | 910 | 420 | 10 | 9.6 | 0.49 |
| Inv. ex. | 33 | IQT | 1250 | 1210 | 960 | 950 | 470 | 10 | 10.2 | 0.33 |
| Inv. ex. | 34 | IQT | 1250 | 1210 | 960 | 950 | 470 | 10 | 11.2 | 0.33 |
| Inv. ex. | 35 | IQT | 1250 | 1210 | 960 | 950 | 470 | 11 | 9.0 | 0.25 |
| Inv. ex. | 36 | OT | 1250 | 1210 | 960 | 910 | 430 | 11 | 10.6 | 0.34 |
| Inv. ex. | 37 | OT | 1250 | 1210 | 960 | 910 | 430 | 12 | 9.7 | 0.22 |
| Inv. ex. | 38 | IQT | 1250 | 1210 | 960 | 950 | 470 | 10 | 8.3 | 0.33 |
| Inv. ex. | 39 | IQT | 1250 | 1210 | 960 | 950 | 470 | 10 | 11.8 | 0.44 |
| Inv. ex. | 40 | OT | 1250 | 1210 | 960 | 910 | 420 | 12 | 9.8 | 0.33 |
| Inv. ex. | 41 | OT | 1250 | 1210 | 960 | 910 | 420 | 12 | 11.5 | 0.34 |
| Inv. ex. | 42 | OT | 1250 | 1210 | 960 | 910 | 420 | 11 | 9.1 | 0.45 |
| Inv. ex. | 43 | OT | 1250 | 1210 | 960 | 910 | 420 | 11 | 9.1 | 0.45 |
| Inv. ex. | 44 | OT | 1250 | 1210 | 960 | 910 | 420 | 11 | 9.3 | 0.48 |
| Inv. ex. | 45 | OT | 1250 | 1210 | 960 | 910 | 420 | 10 | 10.6 | 0.36 |
| Inv. ex. | 46 | OT | 1250 | 1210 | 960 | 910 | 420 | 12 | 11.8 | 0.44 |
| Inv. ex. | 47 | OT | 1250 | 1210 | 960 | 910 | 420 | 10 | 11.3 | 0.50 |
| Inv. ex. | 48 | OT | 1250 | 1210 | 960 | 910 | 420 | 11 | 11.6 | 0.24 |
| Inv. ex. | 49 | OT | 1250 | 1210 | 960 | 910 | 420 | 11 | 10.3 | 0.40 |
| Inv. ex. | 50 | OT | 1250 | 1210 | 960 | 910 | 420 | 10 | 8.9 | 0.43 |
| Inv. ex. | 51 | OT | 1250 | 1210 | 960 | 910 | 420 | 11 | 11.0 | 0.41 |
| Inv. ex. | 52 | OT | 1250 | 1210 | 960 | 910 | 420 | 12 | 11.3 | 0.36 |
| Inv. ex. | 53 | OT | 1250 | 1210 | 960 | 910 | 420 | 12 | 11.8 | 0.44 |
| Inv. ex. | 54 | OT | 1250 | 1210 | 960 | 910 | 420 | 10 | 11.8 | 0.42 |
| Inv. ex. | 55 | OT | 1250 | 1210 | 960 | 910 | 420 | 12 | 8.1 | 0.49 |
| Inv. ex. | 56 | OT | 1250 | 1210 | 960 | 910 | 420 | 10 | 8.7 | 0.25 |
| Inv. ex. | 57 | OT | 1250 | 1210 | 960 | 910 | 420 | 10 | 12.5 | 0.44 |

| Ex. | No. | After quenching and tempering | | | After annealing | | | |
|---|---|---|---|---|---|---|---|---|
| | | Tensile strength MPa | Reduction of area % | Electrolysis filtered Fe quantity | Annealing Temp. ° C. | Hardness HV | Tensile strength MPa | Tensile drawing ratio % |
| Inv. ex. | 27 | 2316 | 43.7 | 0.44 | 425 | 604 | 2096 | 43.9 |
| Inv. ex. | 28 | 2293 | 42.6 | 0.53 | 425 | 618 | 2086 | 40.5 |
| Inv. ex. | 29 | 2230 | 44.7 | 0.77 | 426 | 619 | 2009 | 40.9 |
| Inv. ex. | 30 | 2313 | 41.5 | 0.53 | 425 | 608 | 2103 | 44.6 |
| Inv. ex. | 31 | 2284 | 40.8 | 0.40 | 425 | 620 | 2091 | 44.6 |
| Inv. ex. | 32 | 2273 | 43.7 | 0.64 | 425 | 620 | 2074 | 43.5 |
| Inv. ex. | 33 | 2293 | 41.7 | 0.42 | 425 | 620 | 2122 | 44.7 |
| Inv. ex. | 34 | 2280 | 43.6 | 0.48 | 425 | 620 | 2086 | 43.9 |
| Inv. ex. | 35 | 2322 | 40.0 | 0.54 | 425 | 607 | 2111 | 40.3 |
| Inv. ex. | 36 | 2280 | 40.6 | 0.57 | 425 | 611 | 2090 | 42.7 |
| Inv. ex. | 37 | 2274 | 41.0 | 0.40 | 425 | 616 | 2118 | 40.0 |
| Inv. ex. | 38 | 2278 | 43.4 | 0.52 | 425 | 617 | 2099 | 44.7 |
| Inv. ex. | 39 | 2316 | 42.0 | 0.84 | 425 | 611 | 2096 | 42.9 |
| Inv. ex. | 40 | 2284 | 41.1 | 0.65 | 425 | 616 | 2102 | 40.2 |
| Inv. ex. | 41 | 2284 | 42.4 | 0.47 | 425 | 604 | 2095 | 42.7 |
| Inv. ex. | 42 | 2316 | 41.9 | 0.84 | 425 | 604 | 2107 | 42.0 |
| Inv. ex. | 43 | 2288 | 42.1 | 0.46 | 425 | 610 | 2089 | 44.1 |
| Inv. ex. | 44 | 2311 | 40.3 | 0.78 | 425 | 604 | 2104 | 44.3 |
| Inv. ex. | 45 | 2274 | 43.4 | 0.51 | 425 | 602 | 2067 | 40.8 |
| Inv. ex. | 46 | 2274 | 45.0 | 0.76 | 425 | 616 | 2083 | 40.8 |
| Inv. ex. | 47 | 2314 | 43.2 | 0.96 | 425 | 608 | 2108 | 44.1 |
| Inv. ex. | 48 | 2319 | 44.8 | 0.29 | 425 | 613 | 2093 | 41.2 |
| Inv. ex. | 49 | 2305 | 41.7 | 0.55 | 425 | 602 | 2067 | 44.7 |
| Inv. ex. | 50 | 2297 | 44.3 | 0.83 | 425 | 613 | 2089 | 40.8 |
| Inv. ex. | 51 | 2279 | 43.5 | 0.68 | 425 | 607 | 2087 | 43.8 |
| Inv. ex. | 52 | 2272 | 43.9 | 0.55 | 425 | 613 | 2110 | 43.6 |
| Inv. ex. | 53 | 2310 | 43.6 | 0.71 | 425 | 604 | 2108 | 44.0 |
| Inv. ex. | 54 | 2303 | 40.7 | 0.49 | 425 | 605 | 2105 | 40.1 |
| Inv. ex. | 55 | 2298 | 42.1 | 0.50 | 425 | 616 | 2075 | 42.2 |

TABLE 4-continued

| | | | | | | | | | |
|---|---|---|---|---|---|---|---|---|---|
| Inv. ex. | 56 | 2282 | 42.6 | 0.70 | 425 | 605 | 2112 | 43.0 |
| Inv. ex. | 57 | 2265 | 43.5 | 0.58 | 425 | 622 | 2128 | 41.4 |

(Note)
Electrolysis filter Fe quantity: [Amount of Fe in residue on 0.2 μm filter]/[Steel electrolysis amount] × 100

TABLE 5

| Ex. | No. | Chemical compositions (mass %) | | | | | | | | | | | |
|---|---|---|---|---|---|---|---|---|---|---|---|---|---|
| | | C | Si | Mn | P | S | N | Cr | V | Al | Ti | Nb | Mo |
| Inv. ex. | 58 | 0.59 | 2.06 | 0.71 | 0.004 | 0.008 | 0.0034 | 1.33 | 0.06 | 0.002 | | 0.006 | 0.11 |
| Inv. ex. | 59 | 0.57 | 2.50 | 0.75 | 0.006 | 0.003 | 0.0037 | 1.05 | 0.07 | 0.003 | | 0.008 | 0.13 |
| Inv. ex. | 60 | 0.48 | 2.50 | 0.75 | 0.006 | 0.003 | 0.0038 | 1.14 | 0.07 | 0.001 | | 0.008 | 0.13 |
| Inv. ex. | 61 | 0.59 | 1.78 | 0.75 | 0.006 | 0.003 | 0.0037 | 0.83 | 0.09 | 0.003 | | 0.008 | 0.13 |
| Inv. ex. | 62 | 0.66 | 2.02 | 0.52 | 0.005 | 0.003 | 0.0033 | 0.95 | 0.06 | 0.001 | | 0.008 | 0.17 |
| Inv. ex. | 63 | 0.65 | 2.42 | 0.66 | 0.003 | 0.010 | 0.0030 | 0.51 | 0.05 | 0.002 | | 0.008 | 0.17 |
| Inv. ex. | 64 | 0.58 | 2.42 | 0.48 | 0.010 | 0.010 | 0.0031 | 0.96 | 0.06 | 0.002 | | 0.008 | 0.18 |
| Inv. ex. | 65 | 0.58 | 2.22 | 0.67 | 0.004 | 0.005 | 0.0037 | 0.75 | 0.05 | 0.001 | | 0.008 | 0.32 |
| Inv. ex. | 66 | 0.66 | 1.96 | 0.50 | 0.007 | 0.007 | 0.0040 | 0.94 | 0.06 | 0.003 | | 0.008 | 0.17 |
| Inv. ex. | 67 | 0.65 | 2.45 | 0.74 | 0.004 | 0.010 | 0.0031 | 0.88 | 0.08 | 0.003 | | 0.008 | 0.15 |
| Comp. ex. | 68 | 0.68 | 1.20 | 0.60 | 0.010 | 0.006 | 0.0030 | 0.99 | | 0.001 | | 0.010 | 0.17 |
| Comp. ex. | 69 | 0.72 | 2.30 | 0.63 | 0.005 | 0.003 | 0.0033 | 1.00 | | 0.002 | | 0.009 | 0.17 |
| Comp. ex. | 70 | 0.63 | 2.33 | 0.53 | 0.008 | 0.003 | 0.0031 | 1.00 | | 0.002 | | 0.010 | 0.10 |
| Comp. ex. | 71 | 0.51 | 1.99 | 0.57 | 0.011 | 0.006 | 0.0034 | 1.17 | | 0.003 | | 0.010 | 0.15 |
| Comp. ex. | 72 | 0.73 | 2.31 | 0.68 | 0.004 | 0.006 | 0.0034 | 0.74 | | 0.002 | | 0.010 | 0.13 |
| Comp. ex. | 73 | 0.68 | 2.02 | 0.76 | 0.007 | 0.010 | 0.0031 | 1.21 | | 0.002 | | 0.010 | 0.17 |
| Comp. ex. | 74 | 0.55 | 2.03 | 0.57 | 0.002 | 0.005 | 0.0031 | 1.12 | | 0.003 | | 0.010 | 0.13 |
| Comp. ex. | 75 | 0.66 | 2.00 | 0.59 | 0.007 | 0.005 | 0.0030 | 0.83 | | 0.002 | | 0.010 | 0.16 |
| Comp. ex. | 76 | 0.72 | 2.48 | 0.74 | 0.007 | 0.010 | 0.0036 | 1.26 | | 0.003 | | 0.010 | 0.12 |
| Comp. ex. | 77 | 0.69 | 2.27 | 0.48 | 0.003 | 0.007 | 0.0034 | 1.28 | | 0.002 | | 0.010 | 0.13 |
| Comp. ex. | 78 | 0.59 | 2.01 | 0.69 | 0.010 | 0.004 | 0.0033 | 0.90 | | 0.002 | | 0.010 | 0.16 |
| Comp. ex. | 79 | 0.70 | 2.07 | 0.48 | 0.011 | 0.002 | 0.0034 | 1.12 | | 0.002 | | 0.010 | 0.11 |
| Comp. ex. | 80 | 0.66 | 2.19 | 0.67 | 0.006 | 0.002 | 0.0034 | 1.13 | | 0.001 | | 0.010 | 0.14 |
| Comp. ex. | 81 | 0.65 | 2.50 | 1.65 | 0.006 | 0.009 | 0.0032 | 0.81 | | 0.003 | | 0.010 | 0.13 |

| Ex. | No. | Chemical compositions (mass %) | | | | | | | | | | | |
|---|---|---|---|---|---|---|---|---|---|---|---|---|---|
| | | W | Ta | Ni | Cu | Co | B | Ca | Zr | Hf | Te | Sb | Mg |
| Inv. ex. | 58 | 0.21 | | | | | | | | | | | 0.0004 |
| Inv. ex. | 59 | 0.21 | | | | | | | | | | | 0.0004 |
| Inv. ex. | 60 | 0.21 | | | | | | | | | | | |
| Inv. ex. | 61 | 0.21 | | | | | | | | | | | |
| Inv. ex. | 62 | 0.21 | | | | | | | | | | | |
| Inv. ex. | 63 | 0.21 | | | | | | | | | | | |
| Inv. ex. | 64 | 0.06 | | | | | | | | | | | |
| Inv. ex. | 65 | 0.21 | | | | | | | | | | | |
| Inv. ex. | 66 | 0.45 | | | | | | | | | | | |
| Inv. ex. | 67 | 0.21 | 0.04 | | | | | | | | | | 0.0004 |
| Comp. ex. | 68 | 0.22 | | | | | | | | | | | |
| Comp. ex. | 69 | 0.17 | | | | | | | | | | | |
| Comp. ex. | 70 | 0.21 | | | | | | | | | | | |
| Comp. ex. | 71 | 0.34 | | | | | | | | | | | |
| Comp. ex. | 72 | 0.32 | | | | | | | | | | | |
| Comp. ex. | 73 | 0.25 | | | | | | | | | | | |
| Comp. ex. | 74 | 0.15 | | | | | | | | | | | |
| Comp. ex. | 75 | 0.21 | | | | | | | | | | | |
| Comp. ex. | 76 | 0.25 | | | | | | | | | | | |
| Comp. ex. | 77 | 0.14 | | | | | | | | | | | |
| Comp. ex. | 78 | 0.19 | | | | | | | | | | | |
| Comp. ex. | 79 | 0.17 | | | | | | | | | | | |
| Comp. ex. | 80 | 0.22 | | | | | | | | | | | |
| Comp. ex. | 81 | 0.23 | | | | | | | | | | | |

TABLE 6

| Example | No. | Radiant tube furnace high frequency induction heating | Heating temperature Holding °C. | Normalizing (rolling)°C. | Patenting °C. | Quenching °C. | Tempering °C. | After quenching and tempering Residual γ # | γ % | Electrolysis filter Fe quantity |
|---|---|---|---|---|---|---|---|---|---|---|
| Inv. ex | 58 | OT | 1250 | 1210 | 960 | 910 | 420 | 11 | 11.5 | 0.27 |
| Inv. ex | 59 | OT | 1250 | 1210 | 960 | 910 | 420 | 11 | 9.3 | 0.20 |
| Inv. ex | 60 | OT | 1250 | 1210 | 960 | 910 | 420 | 12 | 10.8 | 0.41 |
| Inv. ex | 61 | OT | 1250 | 1210 | 960 | 910 | 420 | 11 | 9.3 | 0.27 |
| Inv. ex | 62 | OT | 1250 | 1210 | 960 | 910 | 420 | 11 | 8.9 | 0.48 |
| Inv. ex | 63 | OT | 1250 | 1210 | 960 | 910 | 420 | 11 | 9.2 | 0.28 |
| Inv. ex | 64 | OT | 1250 | 1210 | 960 | 910 | 420 | 12 | 9.9 | 0.24 |
| Inv. ex | 65 | OT | 1250 | 1210 | 960 | 910 | 420 | 11 | 10.0 | 0.39 |
| Inv. ex | 66 | OT | 1250 | 1210 | 960 | 910 | 420 | 10 | 11.5 | 0.23 |
| Inv. ex | 67 | OT | 1250 | 1210 | 960 | 910 | 420 | 10 | 11.6 | 0.46 |
| Comp. ex. | 68 | OT | 1250 | 1210 | 950 | 910 | 420 | 10 | 9.7 | 1.53 |
| Comp. ex. | 69 | OT | 1250 | 1210 | 890 | 910 | 420 | 11 | 9.2 | 1.96 |
| Comp. ex. | 70 | OT | 1250 | 1210 | 890 | 910 | 420 | 11 | 10.7 | 1.82 |
| Comp. ex. | 71 | OT | 1250 | 1210 | 890 | 910 | 420 | 11 | 11.7 | 1.90 |
| Comp. ex. | 72 | IQT | 1250 | 1210 | 890 | 950 | 470 | 11 | 9.4 | 1.62 |
| Comp. ex. | 73 | IQT | 1250 | 1210 | 890 | 950 | 470 | 12 | 9.2 | 1.75 |
| Comp. ex. | 74 | IQT | 1250 | 1210 | 890 | 950 | 470 | 11 | 11.0 | 1.65 |
| Comp. ex. | 75 | OT | 1250 | 1210 | 960 | 950 | 570 | 11 | 11.4 | 1.64 |
| Comp. ex. | 76 | OT | 1250 | 1210 | 960 | 950 | 570 | 10 | 11.0 | 1.53 |
| Comp. ex. | 77 | OT | 1250 | 1020 | 960 | 910 | 420 | 12 | 8.2 | 1.74 |
| Comp. ex. | 78 | OT | 1250 | 1020 | 960 | 950 | 420 | 11 | 10.3 | 1.86 |
| Comp. ex. | 79 | OT | 1250 | 1020 | 960 | 950 | 420 | 11 | 8.9 | 1.53 |
| Comp. ex. | 80 | OT | 1250 | 1210 | 950 | 1000 | 420 | 9 | 8.3 | 0.38 |
| Comp. ex. | 81 | OT | 1250 | 1210 | 950 | 910 | 420 | 11 | 17.3 | 0.31 |

| Example | No. | After quenching and tempering Tensile strength MPa | Reduction of area % | After annealing Electrolysis filter Fe quantity | Annealing temperature °C. | Hardness HV | Tensile strength MPa | Tensile drawing % |
|---|---|---|---|---|---|---|---|---|
| Inv. ex | 58 | 2281 | 41.0 | 0.55 | 425 | 608 | 2070 | 43.0 |
| Inv. ex | 59 | 2286 | 44.5 | 0.28 | 425 | 612 | 2098 | 42.2 |
| Inv. ex | 60 | 2282 | 40.2 | 0.84 | 425 | 611 | 2075 | 41.8 |
| Inv. ex | 61 | 2305 | 40.5 | 0.43 | 425 | 613 | 2080 | 41.6 |
| Inv. ex | 62 | 2279 | 43.2 | 0.58 | 425 | 618 | 2086 | 43.0 |
| Inv. ex | 63 | 2275 | 40.8 | 0.57 | 425 | 619 | 2091 | 41.2 |
| Inv. ex | 64 | 2307 | 43.7 | 0.68 | 425 | 610 | 2110 | 40.3 |
| Inv. ex | 65 | 2301 | 40.5 | 0.63 | 425 | 610 | 2098 | 40.5 |
| Inv. ex | 66 | 2301 | 41.7 | 0.44 | 425 | 619 | 2090 | 43.3 |
| Inv. ex | 67 | 2278 | 40.5 | 0.78 | 425 | 617 | 2108 | 42.4 |
| Comp. ex. | 68 | 2056 | 25.4 | 1.83 | 425 | 588 | 1993 | 32.1 |
| Comp. ex. | 69 | 2308 | 30.3 | 2.20 | 425 | 602 | 2084 | 26.6 |
| Comp. ex. | 70 | 2311 | 34.0 | 2.02 | 425 | 605 | 2105 | 30.0 |
| Comp. ex. | 71 | 2318 | 30.0 | 1.94 | 425 | 608 | 2125 | 28.8 |
| Comp. ex. | 72 | 2327 | 33.0 | 2.03 | 425 | 610 | 2114 | 26.3 |
| Comp. ex. | 73 | 2314 | 29.0 | 1.89 | 425 | 607 | 2124 | 28.8 |
| Comp. ex. | 74 | 2329 | 25.2 | 2.02 | 425 | 603 | 2094 | 26.4 |
| Comp. ex. | 75 | 2097 | 29.8 | 1.95 | 425 | 588 | 1989 | 26.2 |
| Comp. ex. | 76 | 2138 | 28.4 | 1.74 | 425 | 585 | 1958 | 27.2 |
| Comp. ex. | 77 | 2143 | 33.9 | 2.28 | 425 | 587 | 1997 | 34.3 |
| Comp. ex. | 78 | 2125 | 33.5 | 2.09 | 425 | 579 | 1968 | 34.4 |
| Comp. ex. | 79 | 2130 | 31.0 | 1.74 | 425 | 575 | 1952 | 30.2 |
| Comp. ex. | 80 | 2317 | 33.3 | 0.40 | 425 | 612 | 2147 | 32.2 |
| Comp. ex. | 81 | 2007 | 27.8 | 0.55 | 427 | 572 | 1813 | 29.8 |

(Note)
electrolysis filter Fe quantity: [the Fe quantity within the filtrate on the 0.2 μm filter]/[steel electrolyzed quantity] × 100

INDUSTRIAL APPLICABILITY

The present invention steel not only reduces the austenite grain size and amount of residual austenite, but also positively utilizes the ε carbides seen after quenching and tempering very likely to be overlooked in the past so as raise the toughness of steel wire increased in strength to a strength of 2000 MPa or more and furthermore facilitates spring fabrication (coiling). For this reason, it has a remarkable effect of enabling springs possessing high strength and high toughness to be fabricated.

The invention claimed is:

1. A high-strength, heat treated steel for use in automobile springs, wherein the chemical composition of said steel consisting of, by mass %,
C: 0.4 to 0.74%,
Si: 1.7 to 3.0%,
Mn: 0.1 to 2.0%,
restricting
N: to 0.005% or less,
P: to 0.015% or less,
S: to 0.015% or less,
O: to 0.0002 to 0.01%, and
Al: to 0.005% or less; and
at least one of
Ti: 0.001 to less than 0.05%,
W: 0.05 to 0.5%, and
Ta: 0.001 to 0.5%; and
optionally at least one of
Cr: 0.51 to 2.5%,
V: 0.02 to 0.1%,
Nb: 0.001 to less than 0.05%,
Mo: 0.05 to 0.5%,
Ni: 0.05 to 3.0%,
Cu: 0.05 to 0.5%,
Co: 0.05 to 3.0%,
B: 0.0005 to 0.006%,
Te: 0.0002 to 0.01%,
Sb: 0.0002 to 0.01%,
Mg: 0.0001 to 0.0005%,
Zr: 0.0001 to 0.0005%,
Ca: 0.0002 to 0.01%, and
Hf: 0.0002 to 0.01%; and
a balance of Fe and unavoidable impurities, and
wherein said steel is formed into said spring; then subsequently tempered at a temperature less than 450° C.; and subsequent to tempering, said steel is stress-relief annealed and nitrided;
wherein said nitrided steel has suppressed formation of coarse cementite precipitates, the presence of said coarse cementite precipitates measured in terms of an analyzed value of the extracted residue resulting from electrolysis
[amount of Fe in residue on 0.2 μm filter]/[steel electrolysis amount]×100≤1.1,
and wherein said nitrided steel has a prior austenite grain size number of #10 or more, a residual austenite in an amount of 15 mass % or less, and has a tensile drawing ratio of 40.0 to 44.7.

2. High strength spring-use heat treated steel as set forth in claim 1, wherein the C is present in an amount of 0.4 to 0.7%.

3. High strength spring-use heat treated steel as set forth in claim 1, wherein the C is present in an amount of 0.4 to 0.65%.

4. High strength spring-use heat treated steel as set forth in claim 1, wherein the N is present in an amount of 0.004% or less.

5. High strength spring-use heat treated steel as set forth in claim 1, wherein the Al is present in an amount of 0.003% or less.

6. High strength spring-use heat treated steel as set forth in claim 1, wherein the Cr is present in an amount of 1.1% or more.

7. High strength spring-use heat treated steel as set forth in claim 1, wherein the Cr is present in an amount of 1.2% or more.

* * * * *

UNITED STATES PATENT AND TRADEMARK OFFICE
CERTIFICATE OF CORRECTION

PATENT NO. : 8,845,825 B2
APPLICATION NO. : 11/919735
DATED : September 30, 2014
INVENTOR(S) : Masayuki Hashimura et al.

It is certified that error appears in the above-identified patent and that said Letters Patent is hereby corrected as shown below:

In the Specification

Column 3, line 54, change "there are ϵ carbides" to -- there are ε carbides --;

Column 3, line 55, change "ϵ carbides are" to -- ε carbides are --;

Column 3, line 59, change "the ϵ carbides disappearing" to -- the ε carbides disappearing --;

Column 4, line 46, change "using ϵ carbides," to -- using ε carbides, --;

Column 4, line 65, change "known as ϵ-carbides etc." to -- known as ε-carbides etc. --;

Column 5, line 46, change "to ϵ-carbide" to -- to ε-carbide --;

Column 6, line 35, change "so-called ϵ carbides" to -- so-called ε carbides --;

Column 6, line 54, change "So-called ϵ" to -- So-called ε --;

Column 7, line 9, change "Fe in the ϵ carbides" to -- Fe in the ε carbides --;

Column 8, line 6, change "nitridation, the ϵ" to -- nitridation, the ε --;

Column 8, line 9, change "utilizing ϵ carbides" to -- utilizing ε carbides --;

Column 9, line 57, change "Ti: 0001 to Less than 0.05%" to -- Ti: 0.0001 to less than 0.05% --;

Column 13, line 1, change "Al: Restricted to 0.005% or Less" to -- Al: Restricted to 0.005% or less --;

Column 14, line 48, change "P: 0.015% or Less" to -- P: 0.015% or less --;

Column 14, line 59, change "S: 0.015% or Less" to -- S: 0.015% or less --;

Column 15, line 43, change "Residual Austenite of 15 Mass% or Less" to -- Residual austenite of 15 mass% or less --;

Column 16, line 58, change "the table×60 min" to -- the table × 60 min --.

Signed and Sealed this
Twenty-eighth Day of April, 2015

Michelle K. Lee
*Director of the United States Patent and Trademark Office*